US012800801B2

(12) United States Patent
Seesselberg et al.

(10) Patent No.: US 12,800,801 B2
(45) Date of Patent: Nov. 17, 2026

(54) WAVEFRONT MANIPULATOR AND OPTICAL DEVICE

(71) Applicant: Carl Zeiss AG, Oberkochen (DE)

(72) Inventors: Markus Seesselberg, Oberkochen (DE); Marco Pretorius, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 268 days.

(21) Appl. No.: 18/684,170

(22) PCT Filed: Aug. 10, 2022

(86) PCT No.: PCT/EP2022/072432
§ 371 (c)(1),
(2) Date: Feb. 15, 2024

(87) PCT Pub. No.: WO2023/020911
PCT Pub. Date: Feb. 23, 2023

(65) Prior Publication Data

US 2024/0361500 A1 Oct. 31, 2024

(30) Foreign Application Priority Data

Aug. 19, 2021 (DE) ......................... 102021121562.5

(51) Int. Cl.
*G02B 3/00* (2006.01)
*G02B 3/02* (2006.01)

(52) U.S. Cl.
CPC ............. *G02B 3/0081* (2013.01); *G02B 3/02* (2013.01); *G02B 2003/0093* (2013.01)

(58) Field of Classification Search
CPC . G02B 3/0081; G02B 3/02; G02B 2003/0093
See application file for complete search history.

(56) References Cited

U.S. PATENT DOCUMENTS 3,305,294 A 2/1967 Alvarez
6,912,092 B2 6/2005 Ukuda
(Continued)

FOREIGN PATENT DOCUMENTS

DE 102012101262 B3 4/2013
DE 102013100680 A1 7/2014
(Continued)

OTHER PUBLICATIONS

Iwona A. Palusinski et al., Lateral-shift variable aberration generators, Applied Optics, vol. 38, Jan. 1, 1999, pp. 86-90, 5 pages.
(Continued)

*Primary Examiner* — Jack Dinh
(74) *Attorney, Agent, or Firm* — Skaar Ulbrich Macari, P.A.

(57) ABSTRACT

A wavefront manipulator includes a first optical component and a second optical component arranged one behind the other along a reference axis. The first optical component and the second optical component are arranged movably relative to one another in a plane perpendicular to the reference axis. The first optical component and the second optical component each include a first optical element having at least one freeform surface, a refractive index m and an Abbe number $v_1$, and a second optical element having at least one freeform surface, a refractive index $n_2$ and an Abbe number $v_2$, which are arranged one behind the other along the reference axis, the Abbe numbers $v_1$ and $v_2$ differing from one another ($v_1 \neq v_2$).

19 Claims, 11 Drawing Sheets

(56) References Cited

U.S. PATENT DOCUMENTS

| | | | |
|---|---|---|---|
| 7,158,320 | B2 | 1/2007 | Nishio |
| 8,503,080 | B2 | 8/2013 | Seesselberg et al. |
| 10,082,652 | B2 | 9/2018 | Zhou et al. |
| 10,746,975 | B2 | 8/2020 | Pretorius et al. |
| 2011/0026118 | A1 | 2/2011 | Seesselberg et al. |
| 2014/0285905 | A1 | 9/2014 | Zhou et al. |
| 2016/0131900 | A1 | 5/2016 | Pretorius |
| 2017/0307860 | A1 | 10/2017 | Pretorius et al. |

FOREIGN PATENT DOCUMENTS

| | | | |
|---|---|---|---|
| DE | 102011055777 | B4 | 2/2015 |
| DE | 102015119255 | A1 | 5/2017 |
| WO | 2013120800 | A1 | 8/2013 |
| WO | 2015110916 | A1 | 7/2015 |

OTHER PUBLICATIONS

D. Werdehausen et al., Optica, vol. 6, Aug. 2019, pp. 1031-1038, 8 pages.

A.W. Lohmann, A New Class of Varifocal Lenses, Applied Optics, vol. 9, No. 7, Jul. 1970, 3 pages.

Yongchao Zou et al., Miniature tunable multi-element Alvarez lenses, 2014 International Conference on Optical Mems and Nanophotonics (OMN), IEEE, doi:10.1109/OMN.2014.6924520, ISSN 2160-5033, ISBN 978-1-4577-1511-2, (Aug. 17, 2014), pp. 23-24, (Oct. 14, 2014), XP032658420, 2014, 2 pages.

International Search Report rendered by the International Searching Authority for PCT/EP2022/072432, dated Dec. 14, 2022, 3 pages.

International Preliminary Report on Patentability rendered by the International Searching Authority for PCT/EP2022/072432, dated Feb. 13, 2024, 9 pages.

```
              RDY          THI          RMD      GLA
OBJ:        INFINITY     250,000000
  1:        INFINITY       0,800000              PLASF47_SCHOTT
  2:        INFINITY       0,800000              'P-CARBO'
   SPS XYP:
  3:        INFINITY       0,050000
  4:        INFINITY       0,800000              'P-CARBO'
   SPS XYP:
  5:        INFINITY       0,800000              PLASF47_SCHOTT
  6:        INFINITY       0,500000
STO:        INFINITY       0,000000
  8:        17,85460       4,000000              FK5_SCHOTT
   ASP:
   K  :     0,000000
   CUF:     0,000000
   A:-0,116309E-04  B:-0,246389E-07  C:-0,511441E-10  D:-0,194977E-12
  9:        -76,59000      1,000000              SF1_SCHOTT
 10:        275,92000      0,000000
   DOE:
   HOR:     1,000000
   HWL:     546,00                     HCT:  R
                                       BLT:  IDEAL
   HCO
   C1: -1,9089E-04  C2:  5,4604E-07
> 11:       INFINITY       0,000000
  12:       INFINITY      50,000000
 IMG:       INFINITY       0,000000
```

```
               RDY              THI       RMD       GLA
 OBJ:       INFINITY        500,000000
   1:       INFINITY          0,000000
    XDE:    0,000000   YDE:   1,966888   ZDE:    0,000000
    ADE:    0,000000   BDE:   0,000000   CDE:    0,000000
   2:       INFINITY          1,000000       PLASF47_SCHOTT
   3:       INFINITY          0,000000
    SPS XYP:
    SCO
         Y:  1,1469E-02    X2Y: -3,0928E-04     Y3: -1,0310E-04
       X4Y:  4,6548E-09   X2Y3:  3,0196E-09     Y5:  9,2867E-10
   4:       INFINITY          0,000000
    XDE:    0,000000   YDE:  -1,966888   ZDE:    0,000000
    ADE:    0,000000   BDE:   0,000000   CDE:    0,000000
   5:       INFINITY          0,100000
   6:       INFINITY          0,000000
    XDE:    0,000000   YDE:  -1,966888   ZDE:    0,000000
    ADE:    0,000000   BDE:   0,000000   CDE:    0,000000
   7:       INFINITY          1,000000       PLASF47_SCHOTT
    SPS XYP:
    SCO
         Y:  1,1469E-02    X2Y: -3,0928E-04     Y3: -1,0310E-04
       X4Y:  4,6548E-09   X2Y3:  3,0196E-09     Y5:  9,2867E-10
   8:       INFINITY          0,000000
   9:       INFINITY          0,000000
    XDE:    0,000000   YDE:   1,966888   ZDE:    0,000000
    ADE:    0,000000   BDE:   0,000000   CDE:    0,000000
  10:       INFINITY          0,500000
 STO:       INFINITY          0,000000
>  12:      17,85460          4,000000       FK5_SCHOTT
    ASP:
    K   :   0,000000
    CUF:    0,000000
    A:-0,116309E-04  B:-0,246389E-07  C:-0,511441E-10  D:-0,194977E-12
  13:      -76,59000          1,000000       SF1_SCHOTT
  14:      275,92000          0,000000
    DOE:
    HOR:    1,000000
    HWL:    546,00                       HCT:  R
                                         BLT:  IDEAL
    HCO
    C1 : -1,9089E-04   C2 :  5,4604E-07
  15:       INFINITY         50,000000
 IMG:       INFINITY          0,000000
```

Fig. 13

```
                RDY            THI        RMD      GLA
OBJ:        INFINITY       500,000000
  1:        INFINITY         0,000000
    XDE:    0,000000  YDE:   2,000000    ZDE:   0,000000
    ADE:    0,000000  BDE:   0,000000    CDE:   0,000000
  2:        INFINITY         0,800000          PLASF47_SCHOTT
  3:        INFINITY         0,800000          'P-CARBO'
    SPS XYP:
    SCO
           Y:  2,0348E-02       X2: -1,6460E-02       Y2: -1,4682E-03
         X2Y: -1,1335E-03       Y3: -3,7517E-04       X4:  4,2694E-06
        X2Y2: -1,2405E-06       Y4: -4,2758E-07      X4Y: -6,6939E-08
        X2Y3: -2,3783E-08       Y5: -1,4727E-09
  4:        INFINITY         0,000000
  5:        INFINITY         0,000000
    XDE:    0,000000  YDE:  -2,000000    ZDE:   0,000000
    ADE:    0,000000  BDE:   0,000000    CDE:   0,000000
  6:        INFINITY         0.050000
  7:        INFINITY         0.000000
    XDE:    0.000000  YDE:  -2,000000    ZDE:   0,000000
    ADE:    0.000000  BDE:   0,000000    CDE:   0,000000
  8:        INFINITY         0,800000          'P-CARBO'
  9:        INFINITY         0,800000          PLASF47_SCHOTT
    SPS XYP:
    SCO
           Y:  2,0348E-02       X2: -1,6460E-02       Y2: -1,4682E-03
         X2Y: -1,1335E-03       Y3: -3,7517E-04       X4:  4,2694E-06
        X2Y2: -1,2405E-06       Y4: -4,2758E-07      X4Y: -6,6939E-08
        X2Y3: -2,3783E-08       Y5: -1,4727E-09
 10:        INFINITY         0.000000
 11:        INFINITY         0.000000
    XDE:    0,000000  YDE:   2,000000    ZDE:   0,000000
    ADE:    0,000000  BDE:   0,000000    CDE:   0,000000
 12:        INFINITY         0,500000
STO:        INFINITY         0,000000
 14:        17,85460         4,000000       FK5_SCHOTT
    ASP:
      K :   0,000000
    CUF:    0,000000
    A:-0,116309E-04  B:-0,246389E-07  C:-0,511441E-10  D:-0,194977E-12
 15:        -76,59000        1,000000       SF1_SCHOTT
> 16:       275,92000        0,000000
    DOE:
    HOR:    1,000000
    HWL:    546,00              HCT: R
                                BLT: IDEAL
    HCO
    C1 : -1,9089E-04   C2 :  5,4604E-07
 17:        INFINITY        50,000000
IMG:        INFINITY         0,000000
```

Fig. 20

WAVEFRONT MANIPULATOR AND OPTICAL DEVICE

PRIORITY

This application claims the benefit of German Patent Application No. 10 2021 121 562.5 filed on Aug. 19, 2021, which is hereby incorporated herein by reference in its entirety.

FIELD

The present invention relates to a wavefront manipulator having at least a first optical component and a second optical component arranged in succession along a reference axis, with the first optical component and the second optical component being arranged so as to be movable relative to one another perpendicular to the reference axis. Additionally, the invention relates to a use of the wavefront manipulator and to an optical device having a wavefront manipulator.

BACKGROUND

U.S. Pat. No. 3,305,294 A1 by Luiz W. Alvarez describes optical elements with at least a first optical component and a second optical component which are arranged in succession along an optical axis, each have a refractive free-form surface, and are displaceable with respect to one another perpendicular to the optical axis. The refractive power effect of an optical element made up of the two component parts can be varied by lateral displacement of the optical component with the free-form surfaces. Such optical elements are therefore also called Alvarez elements or zoom lenses. A variable refractive power corresponds to a variable focal position, which is describable by a change in the parabolic component of the wavefront of a beam that is incident parallel to the axis. In this sense, a zoom lens can be viewed as a special wavefront manipulator.

The article I. A. Palusinski et al., Lateral-shift variable aberration generators, Applied Optics Vol. 38 (1999) pp. 86-90 [1] has disclosed a variable monochromatic wavefront manipulator for a wavelength $\lambda_0$, which consists of two structurally identical plates made of a material with a refractive index profile n(λ) and each having a free-form surface, the surface shape of which is described by a surface function T(x, y). Both plates can be moved by different displacement paths a perpendicular to the z-axis in the x- and/or y-direction, with the z-axis representing the optical axis. There is a description of various surface functions T(x, y), which are suitable for impressing different wavefront deformations $W_{a,\lambda}(x, y)$ on an incident light wave. Thus, deformations such as tilt, defocus, astigmatism, coma, spherical aberration, etc. can be impressed on an incident wavefront.

For polychromatic optical systems, the monochromatic wavefront manipulator according to citation [1] generates a wavefront deformation $W_{a,\lambda}(x, y)$, which is dependent on the displacement path a and the wavelength λ, in the wavelength range $\lambda_{min}<\lambda<\lambda_{max}$, with the dependence on the wavelength λ being specified by the refractive index profile n(λ) of the plate material. This dependence leads to unwanted chromatic aberrations in most spectrally broadband applications, with the result that the wavefront manipulator cannot be used there.

Documents DE 10 2014 118 383 A1 and WO 2013/120800 A1 describe a wavefront manipulator which comprises at least two optical components which are arranged so as to be displaceable in the opposite sense with respect to one another perpendicular to the optical axis of the objective and which each comprise at least one free-form surface. The optical components can have free-form surfaces and an immersion medium can be situated therebetween. A polychromatic wavefront manipulator with the same basic structure as the wavefront manipulator from citation [1] is described, wherein, however, a liquid is used between the plates rather than air. In one variant, the refractive index profile of this liquid is matched to the refractive index profile of the plate material n(λ) in such a way that the dependence of the wavefront deformation $W_{a,\lambda}(x, y)$ on the refractive index n(λ), and hence on the wavelength λ, is compensated for by the liquid. In this way, it is possible to correct a longitudinal chromatic aberration, for example. In another variant, the wavefront manipulator is designed not to bring about a wavelength deformation at a fixedly predefined fundamental wavelength, but only at the secondary wavelengths. Thus, only a chromatic (=wavelength-dependent) change is brought about in a wavefront term. In this case, the refractive index profile of the immersion liquid is adapted such that it corresponds as exactly as possible to that of the plate material for the fundamental wavelength and has a defined deviation only for the secondary wavelengths.

The polychromatic wavefront manipulator according to DE 10 2014 118 383 A1 and WO 2013/120800 A1 is disadvantageous in that there is a liquid between the plates. The refractive index profile of the liquid and its transparency should not change during the service life of the product, with the result that corresponding demands are to be placed on the liquid. Further, the manipulator should be operated only in a temperature range in which the liquid remains in the liquid state of matter. To prevent the liquid from leaking during the service life of the product, it is necessary to put in much constructional effort, leading to costs and increased installation space requirements. These reasons restrict the use of polychromatic wavefront manipulators according to WO 2013/120800 A1. A further disadvantage is that the use of immersion media is problematic in many device concepts, especially in the field of medicine, and renders complicated technical solutions necessary for containing the immersion liquid between the glass plates and for permanently sealing the components. Further, only the wavefront manipulator as a whole is achromatized by the overlaid effect of the deflected glass elements and the enclosed immersion lens. However, this precludes certain generalized concepts for the structure of wavefront manipulators, especially where only some of several free-form elements are moved and the remaining ones are stationary, for example arrangements with three or more movable free-form plates, in which only one component is moved.

Document DE 10 2011 055 777 B4 describes an optical element having at least a first component and a second optical component arranged in succession along an optical axis, with the first optical component and the second optical component each being arranged so as to be movable relative to one another in a movement direction perpendicular to the optical axis and the first optical component and with the second optical component each having at least one free-form surface. In this case, a first diffractive structure (DOE—diffractive optical element) is assigned to the refractive free-form surface of the first component and a second diffractive structure is assigned to the refractive free-form surface of the second component. The assigned diffractive structures influence a wavelength-dependent effect of the respective refractive free-form surface and are matched to the respective free-form surface in such a way that the influence on the wavelength-dependent effect is a compensation of the wavelength-dependent effect of the respective effect of the refractive free-form surface. However, the difficult production of the hybrid elements with a free-form base surface and a diffractive structure additionally impressed thereon is disadvantageous. Moreover, diffractive structures, even if they are designed as so-called efficiency-achromatized DOEs, always also have stray light from unwanted orders of diffraction, which is unavoidable, especially in the case of imperfect production of the DOE profiles, and represents an exclusion criterion for all stray light-critical applications.

In the zoom optical units with a wavefront manipulator according to U.S. Pat. No. 10,082,652 B2, the employed wavefront manipulators consist of plates made of only one material, which has a wavelength-dependent refractive index n(λ). It is hence clear that the wavefront deformations $W_{a,\lambda}(x, y)$ have a significant dependence on the wavelength, and this becomes noticeable in the zoom optical units as a longitudinal chromatic aberration and as a transverse chromatic aberration. This therefore significantly limits the imaging quality of these zoom optical units. Then again, it has been proven impossible to realize wavefront manipulators according to U.S. Pat. No. 10,082,652 B2 in which the wavefront deformation $W_{a,\lambda}(x, y)$ has a particularly large dependence on the wavelength λ. For example, this may be useful for the compensation of chromatic aberrations of other optical components. Thus, the use of only one material on one plate of the wavefront manipulator significantly restricts the applicability of the zoom concept to cameras which require a good imaging performance over an entire spectrum.

In principle, lenses with a variable refractive power effect are increasingly being used for many applications, for example in camera or cine lenses for realizing a zoom functionality, but also in the context of microscopes or other optical applications. In this case, it is desirable for a virtually wavelength-independent (achromatic) refractive power effect to be provided over the entire adjustment range of the refractive power effect. In the context of stray light-critical applications, the use of diffractive structures was found to be disadvantageous here.

SUMMARY

An object herein is to provide an advantageous wavefront manipulator having at least a first optical component and a second optical component which are arranged in succession along a reference axis and are movable relative to one another perpendicular to the optical axis. Another object is to provide an advantageous optical device. A further object is to specify an advantageous use for the wavefront manipulator.

A wavefront manipulator in certain example embodiments comprises at least a first optical component and a second optical component. The first optical component and the second optical component are arranged in succession along a reference axis. Furthermore, the first optical component and the second optical component are arranged so as to be movable relative to one another in a movement direction perpendicular to the reference axis. In this case, either the first optical component or the second optical component may be arranged so as to be movable in relation to the respective other optical component. By preference, both optical components are arranged so as to be movable in at least one movement direction in a plane perpendicular to the reference axis.

Optical components herein represent separate components bounded by a defined outer surface, which preferably have a solid phase of matter.

In the present context, the reference axis is understood to mean an axis, for example a z-axis of a Cartesian or cylindrical coordinate system, in respect of which the deformation of the wavefront profiles caused by the wavefront manipulator is defined. In other words, the reference axis is the axis in respect of which the deformation of the wavefront profiles provided for by the wavefront manipulator is implemented. In particular, the reference axis may run parallel to a normal of a plane in which the first optical component and the second optical component are movable relative to one another. The reference axis may run parallel to an optical axis or coincide with the latter, said optical axis being defined by a rotationally symmetric optical unit comprising the wavefront manipulator. The reference axis may also be aligned relative to a reference axis of an optical structure in which the wavefront manipulator is used. In this case, a reference axis of the optical structure may be chosen such that it corresponds to an optical axis.

The first optical component and the second optical component each comprise a first optical element and at least one further optical element, which is to say at least two optical elements. The first optical component and the second optical component each comprise a first optical element having at least one free-form surface, a refractive index $n_1$, and an Abbe number $v_1$ and a second optical element having at least one free-form surface, a refractive index $n_2$, and an Abbe number $v_2$. The first optical element and the second optical element are arranged in succession along the reference axis. The Abbe numbers $v_1$ and $v_2$ differ from one another ($v_1 \neq v_2$). The described configuration is advantageous in that, to achieve the effects specified in DE 10 2014 118 383 A1, there is no need for an immersion medium, and hence the restrictions in the context of using an immersion medium described at the outset are avoided.

In a first variant, the absolute value of the difference between the quotient of the refractive index $n_1$ reduced by 1 and the Abbe number $v_1$ of the first optical element and the quotient of the refractive index $n_2$ reduced by 1 and the Abbe number $v_2$ of the second optical element is less than a specified limit value G:

$$\left|\frac{n_1 - 1}{v_1} - \frac{n_2 - 1}{v_2}\right| \leq G.$$

By preference, the limit value G is not more than 0.01, in particular not more than 0.005, and preferably not more than 0.001. In this way, individually achromatized optical components can each be used gainfully within the scope of the wavefront.

The wavefront manipulator in this variant has the advantage of requiring no diffractive structures and also no immersion media, liquids, etc. in order to obtain a wavelength-independent, which is to say achromatic, refractive power effect. The individual optical components used are in each case achromatized, with the result that the wavefront manipulator can be used wherever the intention is to provide a wavelength-independently acting manipulator for any desired but fixed linear combination of Zernike terms of a wavefront. Moreover, applications arise wherever lenses of a variably settable refractive power are required for a large spectral range, thus for example in camera or cine lenses for realizing a zoom functionality. Specifically, particular consideration is given here to zoom lenses for smartphones which have the requirement of a particularly flat structure since the invention enables particularly flat embodiments of an achromatic zoom lens in the direction of the optical axis.

Further, advantageous applications are possible in the context of achromatic zoom lenses in arrangements for a fast Z-scan and in a three-dimensional image stabilization.

Applications for an achromatic wavefront manipulator are given wherever a basic optical unit with at least one variably settable degree of freedom has changeable values of an image error over the adjustment range. This image error can then be compensated for in a targeted manner over the entire adjustment range by the wavefront manipulator, without chromatic aberrations occurring in the process as an unwanted side effect. Once again, application examples are zoom objectives of all types, and in the field of microscopy for correcting all variable influencing parameters of the separation layer system (e.g., a covered slip passed obliquely).

In a second variant, the absolute value of the difference between the Abbe numbers $v_1$ and $v_2$ does not exceed a specified limit value V, $|v_1-v_2|\geq V$. The limit value of the absolute value of the difference between the Abbe number V can be at least 5, by preference at least 10, particularly advantageously at least 15. By preference, it is only the Abbe numbers of the at least two optical elements that differ in this variant, while, at the same time, the refractive indices differ as little as possible (ideally not at all).

In the second variant, the problem of providing a wavefront manipulator with variably settable chromatic variations of one or more wavefront errors is solved. Chromatic aberrations due to zoom lenses appear during the use of the latter in an optical system predominantly as longitudinal chromatic aberrations (in the case of an arrangement near the pupil) or as a chromatic difference of magnification or transverse chromatic aberrations (arrangement near the field) of the imaging, depending on the arrangement of said lenses in the beam path. Other image errors, for example coma or astigmatism, can also be influenced in wavelength-dependent fashion at other positions, with the result that for example a chromatic variation of astigmatism or a chromatic coma may arise as image error.

For example, a wavefront manipulator can be used for the targeted compensation of wavelength-dependent focal errors (longitudinal chromatic aberrations) in optical systems. By way of example, thermally induced or otherwise caused refractive index fluctuations in optical media frequently cause changes in the system refractive power which have a strong wavelength dependence. While the change in refractive power at a central wavelength can usually be compensated for sufficiently well by a known defocus compensator (sliding lens, change in an air gap, etc.), the wavelength dependence of the defocusing remains as a residual error that cannot be compensated for by other means. In this limit case, a wavefront manipulator renders it possible to influence only the longitudinal chromatic aberration and precisely cause no refractive power change at the fundamental wavelength or any other monochromatic wavefront change.

The two variants specified hitherto ultimately represent limit cases. Combinations of the first and second variant are possible to the extent that such combination can also be used to provide a wavefront manipulator which firstly links absolute values of a specific monochromatic wavefront intervention, defined in targeted fashion, with a defined chromatic change in the same wavefront term. To this end, there are applications in the field of microscopy where the problem frequently arises of compensating the wavefront errors arising due to variations in a coverslip thickness or the wavefront errors arising due to variations in a refractive index of an immersion medium. Already simple refocusing of a high aperture microscope objective on another object plane by adjusting the object stage relative to the microscope creates induced image errors at the microscope objective which have absolute values at a central wavelength that can be calculated in advance and at the same time also have a defined chromatic dependence to be calculated in advance. It is possible to design the wavefront manipulator such that it simultaneously creates a defined wavefront change at the fundamental wavelength and a defined spectral change of the same image error type over the wavelength range for a given image error type (Zernike term).

For example, large absolute values of spherical aberration, which has a wavelength-dependent change known in advance (i.e., calculable according to the present objective design), arise in a microscope when changing a coverslip thickness on the optical axis. In this context, a wavefront manipulator can be designed such that it provides precisely the absolute values of the spherical aberration at the fundamental wavelength required for compensation and precisely the required wavelength-dependent change of the spherical aberration over the wavelength range. Further, an additional compensation element for zoom objectives is possible. In this case, a compensation of certain image errors that occur dependent on the zoom setting and that are not correctable in conventional fashion using other optical means can be brought about by a wavefront manipulator.

By preference, the absolute value of the refractive indices of the first optical element $n_1$ and the second optical element $n_2$ does not exceed a specified limit value N, which is to say the following applies: $|n_1-n_2|\leq N$. Advantageously, the limit value of the absolute value of the difference of the refractive indices N is not more than 0.05, in particular 0.01, and by preference 0.002. At the same time, the limit value of the absolute value of the difference between the Abbe number V is advantageously at least 5, by preference at least 10, particularly advantageously at least 15.

For example, the limit value N can be not more than 0.05 ($|n_1-n_2|\leq 0.05$) and the limit value V can be at least 5 ($|v_1-v_2|\geq \mathbf{5}$) at the same time. Preferably, the limit value N is not more than 0.01 ($|n_1-n_2|\leq 0.01$) and the limit value V is at least 10 ($|v_1-v_2|\geq 10$) at the same time. Ideally, it holds true that the limit value N is not more than 0.002 ($|n_1-n_2|\leq 0.002$) and the limit value V is at least 15 ($|v_1-v_2|\geq 15$) at the same time.

By preference, the first optical element and the second optical element are designed to be optically transparent and have a solid phase of matter. When producing the elements, it is possible to initially use liquid or viscoelastic materials such as transparent optical cements, but these are solid in the cured final state.

The optical elements of the individual optical components of the wavefront manipulator are arranged in succession along a reference axis, preferably in a manner directly connected to one another, which is to say without a distance or interspace therebetween. Advantageously, the first and the second optical element have a contact surface, which is preferably designed as a free-form surface. The first and the second optical element can also have an outer surface which is designed as a free-form surface but does not form a contact face to any other optical element.

A free-form surface should be understood in the broader sense to mean a complex surface that can be represented, in particular, by means of regionally defined functions, in particular twice continuously differentiable regionally defined functions. Examples of suitable regionally defined functions are (in particular piecewise) polynomial functions (in particular polynomial splines, such as for example bicubic splines, higher-degree splines of the fourth degree or higher, or polynomial non-uniform rational B-splines (NURBS)). These should be distinguished from simple surfaces, such as for example spherical surfaces, aspherical surfaces, cylindrical surfaces, and toric surfaces, which are described as a circle, at least along a principal meridian. In particular, a free-form surface need not have axial symmetry and need not have point symmetry and can have different values for the mean surface power value in different regions of the surface.

In an exemplary variant, the wavefront manipulator comprises a first and/or second optical component with a first optical element made of a first optically transparent material, which is flat on one side and has a free-form profile on the second side, and a second optical element, precisely complementary thereto, made of a second optically transparent material, the second optical element complementing the first optical element to form a plane-parallel plate, with the first and the second optically transparent material satisfying the equation of condition for achromatism specified below.

$$\frac{n_1 - 1}{v_1} - \frac{n_2 - 1}{v_2} = 0$$

Now, the two materials can be materials that are solid in the final state, for example glass or optical polymers, with the result that there is no need to handle liquids such as immersion oils, etc. With regards to production, it is particularly advantageous if the first material is a glass and the second material is a medium that is initially liquid and cured in a subsequent process step. In this case, only a single profile-shaping production process is required for the first optical element, for instance blank pressing, or grinding and polishing, or else injection molding in the case of plastic. The second, complementary optical element can be formed by filling the free-form profile with a material that is initially liquid and subsequently cures. Then, only the flat outer surface of the second element needs to subsequently be smoothed or polished. Alternatively, the flat and smooth outer termination face of the second free-form element can also be formed by the application of an optically neutral thin plane-parallel glass plate, for instance a cutout from a microscope coverslip. In this way, it is possible to additionally create a particularly scratch-resistant outer surface that is easy to coat. In any case, the second material initially liquid during the production process can subsequently cure, with the result that a compact, inherently stable and, especially as a component, inherently achromatized free-form element arises. For example, the curing material may comprise polyene-based reactive resins (acryl, methacryl, vinyl), the curing of which is implemented thermally or by UV radiation. A multiplicity of suitable and initially liquid materials are also described in U.S. Pat. Nos. 8,503,080 B2, 6,912,092 B2 or 7,158,320 B2, for example. For example, it is also possible to use nanoparticles in a matrix made of epoxy resin or polymethylmethacrylate (PMMA). By varying the concentration of the nanomaterials, it is then possible to set the required refractive indices and Abbe numbers continuously over certain ranges. However, the curing material can also be a blank-pressable glass.

If the first and the second optical element have two parallel flat boundary surfaces to the outside, two (or more) such elements can be brought extremely close together without colliding with one another in the case of the lateral displacement. It is known that the size of the air gap between the plates, which must usually be a few hundredths to a few tenths of a millimeter to avoid collisions, is critical with regards to additional parasitic image errors of a wavefront manipulator. The smaller the air gap between the elements can be designed to be, the smaller the parasitic errors become and the greater the absolute values of the wavefront effects (e.g., refractive powers) can become before interfering effects occur.

The solution represents a development of the solution from DE 10 2014 118 383 A1. The immersion medium between two respective free-form plates is replaced by a solid optical material and a narrow air gap is created by a plane cut in the center of this material, the narrow air gap being small enough to be optically without an effect to a first approximation. As a result, it is now possible to also use a solid optical transparent medium, for example a second glass or an optical polymer, in place of a liquid or an elastic optical cement, the solid optical transparent medium fulfilling the achromatism condition in respect of refractive index and Abbe number which was already described in DE 10 2014 118 383 A1. In this way, it is possible to provide an achromatic wavefront manipulator, for example an achromatic zoom lens, which consists of two (in general also 3 or more) components which are plane-parallel to the outside and have free-form surfaces between the optical elements which are inherently dimensionally stable and particularly easy to grasp and coat.

The fundamental principles for constructing the free-form surfaces are explained below. In the case of an explicit surface representation in the form z(x,y), the free-form surface may preferably be described by a polynomial which only has even powers of x in a direction x orthogonal to the movement direction of the optical components and only has odd powers of y in a direction y parallel to the movement direction. Initially, the free-form surface z(x,y) may be described in general by for example a polynomial expansion of the form $$z(x, y) = \sum_{m,n=1}^{\infty} C_{m,n} x^m y^n,$$

where $C_{m,n}$ represents the expansion coefficient of the polynomial expansion of the free-form surface of order m in respect of the x-direction and of order n in respect of the y-direction. Here, x, y, and z denote the three Cartesian coordinates of a point lying on the surface in the local surface-related coordinate system. Here, the coordinates x and y should be inserted into the equation as dimensionless indices in so-called lens units. Here, lens units means that all lengths are initially specified as dimensionless numbers and subsequently interpreted in such a way that they are multiplied throughout by the same unit of measurement (nm, µm, mm, m). The background for this is that geometric optics are scale-invariant and, in contrast to wave optics, do not possess a natural unit of length.

Deviating from paraxial theory, the coefficients of even terms in the displacement direction may also have small values not equal to zero for the purpose of correcting parasitic ray offset aberrations caused by the finite spacing of the free-form profiles. However, optionally, the coefficients of odd terms perpendicular to the displacement direction are always zero.

In the simplest example embodiment, exactly two elements are displaced transversely to the optical system axis (the one element through the distance Δy in +y, the other through the same distance in the −y-direction at the same time; i.e., the two are displaced in opposite directions and by the same absolute values). The free-form surfaces of the elements of a wavefront manipulator are frequently identical, with the result that the two free-form elements in a zero position complement one another exactly to form a plane-parallel plate. However, optionally, the two free-form surface profiles may also differ slightly from one another in a targeted manner in order to take account of non-paraxial effects which occur on account of the deviation of the height of incidence of rays at the first and second free-form surface due to the finite path in the medium 2. However, it is only difficult to provide a general technical teaching in this respect.

According to the teaching by Alvarez, a pure defocusing effect may be obtained if the free-form surface of the optical components is described by the following 3rd order polynomial:

$$z(x, y) = k \cdot \left(x^2 \cdot y + \frac{y^3}{3}\right)$$

Here, WLOG, the assumption is made that the lateral displacement of the elements occurs along the y-axis, which is defined thereby. Should the displacement occur along the x-axis, the role of x and y should accordingly be interchanged in the equation above. Here, the parameter k scales the profile depth and thus sets the obtainable change in refractive power per unit of the lateral displacement path Δy.

For beams incident parallel to the axis, the lateral displacement of the two elements by a distance Δy brings about a wavefront change according to the equation:

$$\Delta W(x, y) = 2 \cdot k \cdot \Delta n \cdot \left(\Delta y \cdot (x^2 + y^2) + \frac{1}{3}\Delta y^3\right)$$

The change in the parabolic wavefront component corresponds to a change in the focal position. Additionally, there is a phase term ("piston term") that is independent of the pupil coordinate and can usually be neglected with regards to the imaging properties. Stated exactly, this term then has no effect at all on the imaging properties if the element is in the infinite beam path. Accordingly, the surface refractive power of a corresponding zoom lens is given by the following equation: $\varphi = 4 \cdot k \cdot \Delta n \cdot \Delta y$. Here, Δy is the lateral displacement path of an optical component along the y-direction, k is the scaling factor for the profile depth, and $\Delta n = n_1 - n_2$ is the difference between the refractive indices of the materials from which the optical components are formed (first and second optical element with a common free-form surface), at the respective wavelength.

From the generalization of this teaching, it is known that two free-form elements can also be designed to influence other wavefront errors ΔW(x,y) of higher order. In the case of an exactly lateral relative movement of the two free-form elements with respect to one another, a wavefront change ΔW(x,y) is provided precisely when the profile function z(x,y) is designed to be proportional to the anti-derivative of the function ΔW(x,y) in the direction parallel to the displacement direction and proportional to the function ΔW(x, y) perpendicular to the displacement direction. However, this generalized technical teaching in this respect only represents an approximation for the case where the distance between the free-form surfaces tends to zero and the aperture angle load is small. Strictly speaking, the theory is thus only valid for the limit case where the free-form profile depth also tends to zero (thin element approximation, TEA), whereby the range of the settable refractive power effect would then also tend to zero. In practice, this theory should be used as an approximation which allows analytic ansatz systems to be found, which can subsequently be optimized further using numerical methods. The actually usable adjustment range of the elements found thus then is many times greater than what the quasi-paraxial derivation would initially appear to allow.

The condition for selecting the optical materials for the provision of a wavefront manipulator in the form of an achromatic zoom lens can be derived as follows: The wavefront manipulator (zoom lens) comprises at least two optical components described, which in turn are each composed of two optical elements with the refractive indices $n_1(\lambda)$ and $n_2(\lambda)$. If the refractive power of all partial elements of the zoom lens with the refractive index $n_1(\Delta)$ is combined as $\varphi_1$ and the refractive power of all optical elements with the refractive index $n_2(\lambda)$ is combined as $\varphi_2$, then the following applies to these two partial refractive powers:

$$\varphi_1 = 4 \cdot k \cdot \Delta y \cdot (n_1 - 1)$$

and $$\varphi_2 = 4 \cdot k \cdot \Delta y \cdot (n_2 - 1)$$

Here, k is the freely selectable scaling factor of the free-form profile function, Δy is the displacement of the optical components, and $n_1$ and $n_2$ are the refractive indices of the materials of the two optical elements at a central wavelength of the spectral range considered.

In general, the condition for achromatism for two lenses closely next to one another is:

$$\frac{\varphi_1}{v_1} + \frac{\varphi_2}{v_2} = 0$$

Thus, the following condition can be set by insertion for the respectively achromatic optical components used within the scope of the wavefront manipulator:

$$\frac{n_1 - 1}{v_1} - \frac{n_2 - 1}{v_2} = 0$$

Naturally, there may also be a small deviation from the condition above in practice on account of the only restricted selection of available optical materials, in particular when taking into account specific requirements such as durability, thermal expansion, etc., without departing from the scope of the invention.

A CHL manipulator refers to a manipulator with which it is possible to set the longitudinal chromatic aberration variably. The greater the difference in the Abbe number of the media, the smaller the lateral displacements and the flatter the free-form profiles can be for obtaining a given CHL effect of the element. The smaller the differences in the refractive index of the media, the less change there is in the focal position at the central wavelength when a given CHL is set. Suitable material combinations are widespread and easy to find since, at typical refractive indices of glass, the dispersion of optical polymers and epoxy resins are always significantly higher than those of glass. However, it is also easy to find combinations of two polymers or epoxies that meet the condition. In particular, the prior art has disclosed how optical resins or optical cements can be adapted to a given refractive index within a certain range by way of suitable changes in the chemical composition, without this substantially changing the Abbe number.

Using a wavefront manipulator, the suitable choice of the optical media not only allows a longitudinal chromatic aberration CHL to be set to zero in a targeted manner but also allows the optical elements to be embodied such that defined absolute values of CHL are created in a targeted manner. Any deviation from the condition $$\frac{n_1-1}{v_1}-\frac{n_2-1}{v_2}=0$$

or the condition $$\left|\frac{n_1-1}{v_1}-\frac{n_2-1}{v_2}\right|\leq G$$

creates a lateral displacement of the free-form elements in accordance with equation:

$$z(x,y)=k\cdot\left(x^2\cdot y+\frac{y^3}{3}\right),$$

and at the same time a refractive power change at the central wavelength (i.e., a defocus) and, relative thereto, a longitudinal chromatic aberration for the edge or secondary wavelengths. There are applications where such a superimposition is advantageous, for instance if the defocus at the central wavelength can be compensated for by other optical means. However, a strict separation between a change of a central focal position and a change of the longitudinal chromatic aberration is generally desired. The above-described case relates to the situation where the wavefront term to be manipulated is precisely the defocus term only. An analogous procedure can be implemented for every other wavefront term. For example, a change in the 3rd order spherical aberration at the fundamental wavelength and, at the same time, a chromatic (=wavelength-dependent) variation of the 3rd order spherical aberration with a precisely defined relationship thereto can thus be provided by way of an exactly defined deviation from the condition in conjunction with a profile of the shape $$z(x,y)=k\cdot\left(y\cdot x^4+\frac{2}{3}\cdot(x^2\cdot y^3)+\frac{y^5}{3}\right)$$

upon deflection of the components. This chromatic change in the spherical aberration is also referred to as a "Gaussian aberration" and it is an image error that is otherwise hard to control in many optical devices.

Preferably, as already mentioned above, the first optical element and the second optical element each have at least one free-form surface. In this case, the first optical element and the second optical element by preference have a common contact face in the form of a free-form surface. In other words, this is thus a common boundary surface or surface between the two optical elements, with the result that the free-form surfaces of the first optical element and the second optical element correspond to one another.

The free-form surface can be designed to create a wavefront change $\Delta W(x,y)$ at a fundamental wavelength by virtue of the free-form profile function $z(x,y)$ being designed to be proportional to the anti-derivative of $\Delta W(x,y)$ in the direction of the movement of the elements with respect to one another and designed to be proportional to the function $\Delta W(x,y)$ itself perpendicular to the movement direction, where x, y, and z are coordinates of a Cartesian coordinate system and the z-axis runs parallel to the reference axis. In other words, the wavefront effect parallel to the displacement direction is proportional to the derivative of the profile function.

The free-form surface can have a shape in accordance with the free-form profile function $$z(x,y)=k\cdot\left(y\cdot x^4+\frac{2}{3}\cdot(x^2\cdot y^3)+\frac{y^5}{3}\right),$$

where x, y, and z are coordinates of a Cartesian coordinate system and the z-axis runs parallel to the reference axis.

Such a free-form profile function would predominantly influence the spherical aberration and could consequently be used, by way of example, for applications in the field of microscopy to help correct the spherical aberration that occurs when focusing at a different sample depth. There can also be a partial or complete compensation in this way of the spherical aberration caused by the change in thickness of the element (piston term) in the convergent beam path. For example, a wavefront manipulator for influencing the so-called Gaussian aberration, the chromatic variation of the 3rd order spherical aberration, can be provided by two free-form elements with a profile function in accordance with the aforementioned term while simultaneously observing the aforementioned conditions $|n_1-n_2|\leq N$ and $|v_1-v_2|\geq V$ for the optical materials.

A plurality of structure profiles may be additively overlaid, which is to say a structure for changing the refractive power and a structure for changing the spherical aberration can be overlaid such that a corresponding wavefront manipulator varies a refractive power effect during the displacement of the optical components counter to one another and, at the same time, changes a spherical aberration, wherein both changes are proportional to one another with a proportionality factor, which must be arbitrarily but fixedly selected in advance. Even in such more general applications, the rules, presented above, regarding the effect of a corresponding material selection according to the condition $$\left|\frac{n_1-1}{v_1}-\frac{n_2-1}{v_2}\right|\leq G \text{ or } |n_1-n_2|\leq N \text{ and } |v_1-v_2|\geq V$$

can be applied analogously.

According to Lohmann (cf. Appl. Opt. Vol. 9, No 7, (1970), pp. 1669-1671), it is possible to present a zoom lens largely equivalent to the teaching of Alvarez, in which two free-form surfaces for example in the lowest order are described by an equation of the form $z(x,y)=A(x^3+y^3)$, and the relative movement of the elements in relation to one another is carried out along a straight line, perpendicular to the optical system axis, extending at 45° in relation to the x- and y-axis. Here, the constant A once again is a free scaling constant, which describes the maximum profile depth of the free-form surface and, as a result, the refractive power change per unit path length. The description according to Lohmann is not an independent solution, but instead substantially only an alternative representation.

A material with an Abbe number $v_d$ has an anomalous relative partial dispersion if the absolute value of the difference $$\Delta P_{g,F} = P_{g,F} - P_{g,F}^{normal}$$

between the relative partial dispersion $P_{g,F}$ of the material and a normal relative partial dispersion $$P_{g,F}^{normal}$$

at the Abbe number $v_d$ of the material is at least 0.005, in particular at least 0.01. Here, the normal relative partial dispersion is defined by $$P_{g,F}^{normal}(v_d) = 0.6438 - 0.001682\ v_d,$$

which is to say by a straight line in a diagram that shows a dependence between the normal relative partial dispersion $$P_{g,F}^{normal}$$

and the Abbe number $v_d$. Relative partial dispersion describes a difference between the refractive indices of two specific wavelengths in relation to a reference wavelength interval and represents a measure for the relative strength of the dispersion between these two wavelengths in the spectral range. In the present case, the three wavelengths required to this end are the wavelength of the g line of mercury (435.83 nm), the wavelength of the F line of hydrogen (486.13 nm) and the C line of hydrogen (656.21 nm), and so the relative partial dispersion $P_{g,F}$ is given by $$P_{g,F} = \frac{n_g - n_F}{n_F - n_C},$$

where $n_F$ and $n_C$ are the same as in the case of $v_d$. A different definition can also be used for the relative partial dispersion, in which the F and C lines of hydrogen are replaced by the F' and C' lines of cadmium, for example.

Advantageously, at least one, by preference two, of the optical components comprise(s) at least two optical elements 1 and 2, which have a relative partial dispersion $P_{\lambda_1\lambda_2}$ $$P_{\lambda_1\lambda_2} = \frac{n(\lambda_1) - n(\lambda_2)}{n_F - n_C},$$

with the partial dispersions differing by less than a specified limit value T ($P_{\lambda_1\lambda_2,1} - P_{\lambda_1\lambda_2,2} < T$). The specified limit value can be a value of less than or equal to 0.1 ($T \le 0.1$), in particular less than or equal to 0.05 ($T \le 0.05$), for example less than or equal to 0.02 ($T \le 0.02$).

In this way, the wavefront manipulator can be configured as an apochromatic wavefront manipulator, which is to say it can largely correct a chromatic aberration. In the case of an achromat or dichromat, the longitudinal chromatic aberration is initially corrected for exactly two wavelengths. The longitudinal chromatic aberration remaining at a third wavelength deviating therefrom is referred to as the secondary spectrum of the longitudinal chromatic aberration (at this third wavelength). If the latter is then also corrected, reference is made to an apochromat or trichromat. An apochromat (or "trichromat") generates a wavefront deformation $W_{a,\lambda}(x, y)$, in which the spherical component corresponds for three mutually different wavelengths. The condition for a trichromat is that the relative partial dispersions of the two media correspond at this third wavelength. However, two glasses can only correspond in terms of relative partial dispersion and simultaneously differ in terms of the Abbe number (required for the dichromatism condition) if at least one of the two glasses deviates from a normal line of the relative partial dispersion, which is to say has an anomalous relative partial dispersion. Such glasses with anomalous relative partial dispersion are also referred to as long crown or short flint glasses, depending on the sign of the deviation of the partial dispersion from the normal line. In a correspondingly advantageous variant, at least one, by preference two, of the optical components may comprise an optical element which has an anomalous relative partial dispersion. This embodiment is advantageous in that the wavefront manipulator, as an apochromatic wavefront manipulator, can be used for focusing purposes.

By virtue of at least one of the two optical elements made of a material with anomalous partial dispersion, which is to say with a deviation from the normal line, being used, it is possible to also bring about a correction of the secondary chromatic aberrations. To this end, firstly, use could be made of the known mineral glasses with anomalous partial dispersion (for instance the special short flint glasses NKZFSxy or the fluoride ion-containing long crown glasses FKxy). Then again, it is known that some optical cements in particular have partial dispersions that deviate significantly from the normal line (cf. DE 10 2007 051 887 A1). By varying the chemical composition, optical cements can also be modified in a targeted manner such that they can have a particularly large deviation from the normal line. Further, D. Werdehausen et al., Optica Vol. 6 2019, p. 1031 has disclosed that optical cements have a partial dispersion that deviates significantly from the normal line following the addition of what are known as "ITO nanoparticles" (ITO=indium tin oxide), wherein this deviation can be set to targeted values by way of the concentration of the nanoparticles. An apochromatic wavefront manipulator designed as provided herein therefore satisfies the condition $$\left|\frac{n_1 - 1}{v_1} - \frac{n_2 - 1}{v_2}\right| \le G$$

with the aforementioned limit values and additionally satisfies the condition that the relative partial dispersion of the two materials of the optical elements, between the wavelengths $\lambda_1$ and $\lambda_2$ defined by the equation $$P_{\lambda_1\lambda_2} = \frac{n(\lambda_1) - n(\lambda_2)}{n_F - n_C},$$

differs by less than 10%, preferably even by less than 5% and in particular by less than 2%:

$$P_{\lambda_1\lambda_2,1} - P_{\lambda_1\lambda_2,2} < 0.1$$

$$P_{\lambda_1\lambda_2,1} - P_{\lambda_1\lambda_2,2} < 0.05$$

$$P_{\lambda_1\lambda_2,1} - P_{\lambda_1\lambda_2,2} < 0.02$$

The at least two optical components may have the same structural design in relation to their optical features, in particular the optical features of the utilized optical elements. This has the advantage that cost-effective production is possible. Moreover, the Alvarez principle can be beneficially applied.

Furthermore, at least one of the optical components may have at least one plane outer surface which extends perpendicular to the reference axis. For example, at least one optical component of the wavefront manipulator can be configured as a plate, in particular a plane parallel plate. Preferably, all available optical components of the wavefront manipulator are configured as plates, in particular plane-parallel plates. This is advantageous in that the distance between the optical components can be minimized.

The optical components may be arranged so as to be movable relative to one another by translation, in other words arranged so as to be displaceable, in at least one direction perpendicular to the optical axis, which is to say in the x- and/or y-direction. As an addition or alternative, the optical components may be arranged so as to be movable relative to one another by rotation about an axis running parallel to the optical axis (z-direction), which is to say arranged so as to be rotatable. The aforementioned variants allow the use of a plurality of degrees of freedom for correcting aberrations or for realizing focusing, for example in the form of a zoom function, in very small installation space. Such elements that are rotatable against one another are described in the laid-open application document DE 10 2015 119 255 A1. Then, the wavefront deformation contains an angle of rotation $\alpha$ rather than the displacement path a, and the spatial coordinates (x, y) should be replaced by polar coordinates, with the result that the wavefront deformation is given by $W_{\alpha,\lambda}(r, \varphi)$ rather than by $W_{\alpha,\lambda}(x, y)$. Naturally, it is also conceivable that the two optical components are both displaced relative to one another and twisted relative to one another. The wavefront manipulator may comprise at least one sensor for detecting a position and/or a movement of the optical components relative to one another.

At least one optical element of at least one optical component may comprise glass or an optical polymer or plastic or a monomer or a curing material.

According to a further aspect herein, an optical device is provided. By way of example, the optical device can be an objective, in particular a zoom objective, an optical observation device such as for instance a microscope, in particular a surgical microscope, a telescope, a camera, etc. However, it can also be another optical device, such as for example an optical measurement device. Said device is equipped with at least one wavefront manipulator. The effects and advantages described with reference to the wavefront manipulator can therefore be attained in the optical device. The wavefront manipulator may be equipped with a sensor such that the respective displacement $\Delta y$ or twist $\alpha$ is known. This is especially important if the optical device represents a measurement device, for example a color-confocal sensor.

According to a further example embodiment, a use of at least one wavefront manipulator is made available. In the use, at least one wavefront manipulator serves to cause an adjustable change in a wavefront, for example any desired but fixed linear combination of Zernike terms, and/or to bring about one or more of the corrections or reductions specified below: coma, astigmatism, dichromatic correction, trichromatic correction, reduction of the secondary spectrum, reduction of the tertiary spectrum.

In a further use of a wavefront manipulator, the latter can be used to bring about focusing, in particular for focusing in any desired optical system (camera lens, microscope objective, etc.), and/or a position-dependent correction of at least one wavefront error in a zoom objective or a microscope, in particular an objective for a surgical microscope, for an arrangement for a fast Z-scan or for a three-dimensional image stabilization. To this end, the wavefront manipulator can be arranged, in particular, in the region of an (approximately) collimated beam path in the respective optical device and can be laterally deflected, in each case in a manner dependent on the position of the zoom objective, such that said wavefront manipulator compensates a wavefront error (e.g., a longitudinal chromatic aberration, a spherical aberration, etc.) of the respective optical device.

The invention is explained in greater detail below on the basis of exemplary embodiments with reference to the accompanying figures. Although the invention is more specifically illustrated and described in detail by means of the preferred exemplary embodiments, the invention is not restricted by the examples disclosed and other variations can be derived therefrom by a person skilled in the art, without departing from the scope of protection of the invention.

The figures are not necessarily accurate in every detail and to scale, and can be presented in enlarged or reduced form for the purpose of better clarity. For this reason, functional details disclosed here should not be understood as restrictive, but merely to be an illustrative basis that gives guidance to a person skilled in this technical field for using the present invention in various ways.

The expression "and/or" used here, when it is used in a series of two or more elements, means that any of the elements listed can be used alone, or any combination of two or more of the elements listed can be used. If for example a composition containing the components A, B and/or C is described, the composition may contain A alone; B alone; C alone; A and B in combination; A and C in combination; B and C in combination; or A, B, and C in combination.

BRIEF DESCRIPTION OF THE DRAWINGS

FIG. 13 shows the construction data associated with the arrangement shown schematically in FIGS. 7-9.

FIG. 20 shows the construction data associated with the arrangement according to certain embodiments of the invention shown schematically in FIGS. 14-16.

Figure 1:
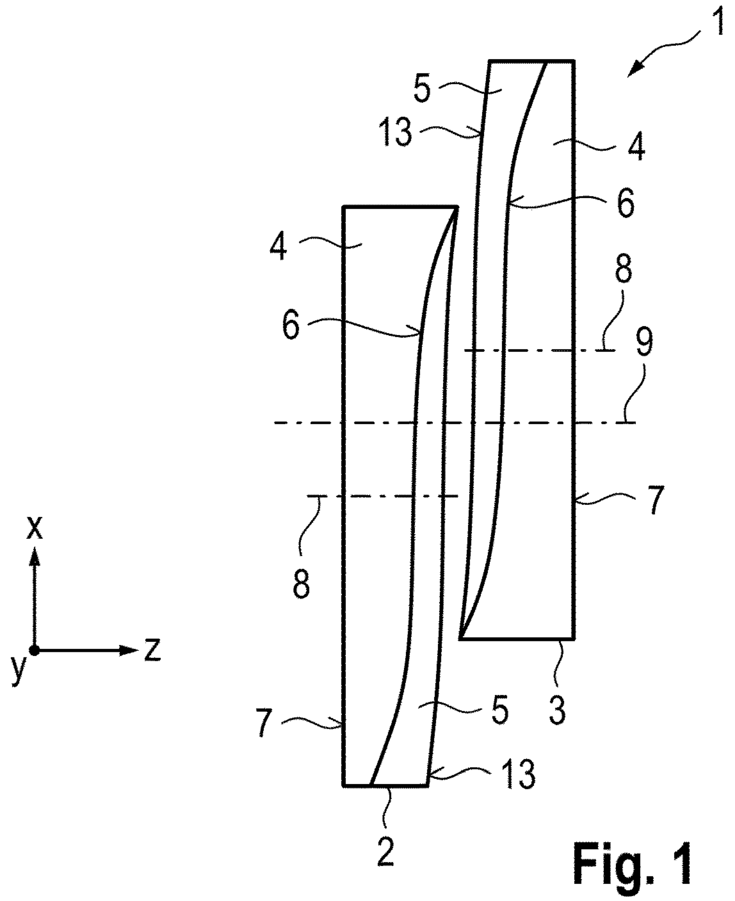
FIG. 1 schematically shows a wavefront manipulator according to certain embodiments of the invention in a longitudinally cut view.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

FIG. 1 schematically shows a wavefront manipulator. The wavefront manipulator 1 comprises a first optical component 2 and a second optical component 3. The first optical component 2 and the second optical component 3 are arranged in succession along an optical axis 9. In the example shown, the optical axis 9 runs parallel to the z-direction of a Cartesian coordinate system. The optical components 2, 3 each have a central axis 8 preferably running parallel to the optical axis 9. The first optical component 2 and the second optical component 3 are arranged so as to be movable relative to one another in a plane perpendicular to the optical axis 9, which is to say in an x-y-plane. The first optical component 2 and the second optical component 3 may thus be arranged so as to be movable relative to one another in a x-y-plane by translation and/or rotation.

The first component 2 and the second component 3 each comprise a first optical element 4 having a refractive index $n_1$ and an Abbe number $v_1$ and a second optical element 5 having a refractive index $n_2$ and an Abbe number $v_1$. The first optical element 4 and the second optical element 5 are in each case arranged in succession along the optical axis. The refractive indices $n_1$ and $n_2$ and the Abbe numbers $v_1$ and $v_1$ are chosen such that the absolute value of the difference between the quotient of the refractive index $n_1$ reduced by 1 and the Abbe number $v_1$ of the first optical element and the quotient of the refractive index $n_2$ reduced by 1 and the Abbe number $v_2$ of the second optical element is less than a specified limit value G:

$$\left|\frac{n_1 - 1}{v_1} - \frac{n_2 - 1}{v_2}\right| \leq G.$$

By preference, the limit value G is not more than 0.01.

The first optical element 4 and the second optical element 5 form a contact face 6, which is preferably configured as a free-form surface. In the variant shown, the two optical components 2 and 3 have the same structural configuration, with corresponding optical elements 4, 5 being arranged facing one another; in the variant shown, the second optical elements 5 are arranged facing one another in each case. Furthermore, the optical components 2 and 3 preferably comprise a flat outer surface 7, with the flat outer surfaces being arranged facing away from one another and being formed by the first optical element 4 in each case. Any other surface geometry may also be used instead of a flat outer surface 7 of the optical components 2, 3, which are directed outwardly as shown in FIG. 1. However, a flat outer surface 7 is advantageous because this reduces the distance between the surfaces of the wavefront manipulator 1 with a curvature and fewer aberrations arise. In particular, the facing outer surfaces 13 of the respective optical component 2, 3 may have a curvature. In this case, the distance between the refractive surfaces of the wavefront manipulator 1 is reduced again, with the result that fewer aberrations arise.

Hereinafter, a solution designed according to certain embodiments for an achromatic focusing optical unit is described as an example; it comprises free-form surfaces whose shape is described in general by a Taylor polynomial expansion:

$$z(x, y) = \sum_{m,n=1}^{\infty} C_{m,n} x^m y^n$$

Here, x, y, and z denote the three Cartesian coordinates of a point lying on the surface in the local surface-related coordinate system. The coefficients of the polynomial expansion are in each case specified in the corresponding lines at associated surface numbers, with the polynomial coefficients being labeled by the powers of the associated expansion terms.

Further, there are rotationally symmetric aspherical surfaces, which are defined by the following equation:

$$z = \frac{(x^2+y^2)/R}{1+\sqrt{1-(1+k)\cdot\frac{(x^2+y^2)}{R^2}}} + A\cdot(x^2+y^2)^2 + B\cdot(x^2+y^2)^3 + C\cdot(x^2+y^2)^4 + D\cdot(x^2+y^2)^5$$

The associated coefficients k, A, B, C and D are specified at the corresponding surfaces, in each case following the vertex radius. Since, from a mathematical point of view, there are infinitely many equivalent representations of the same surfaces, it is self-evident that the invention is not restricted to a specific surface representation.

Figure 2:
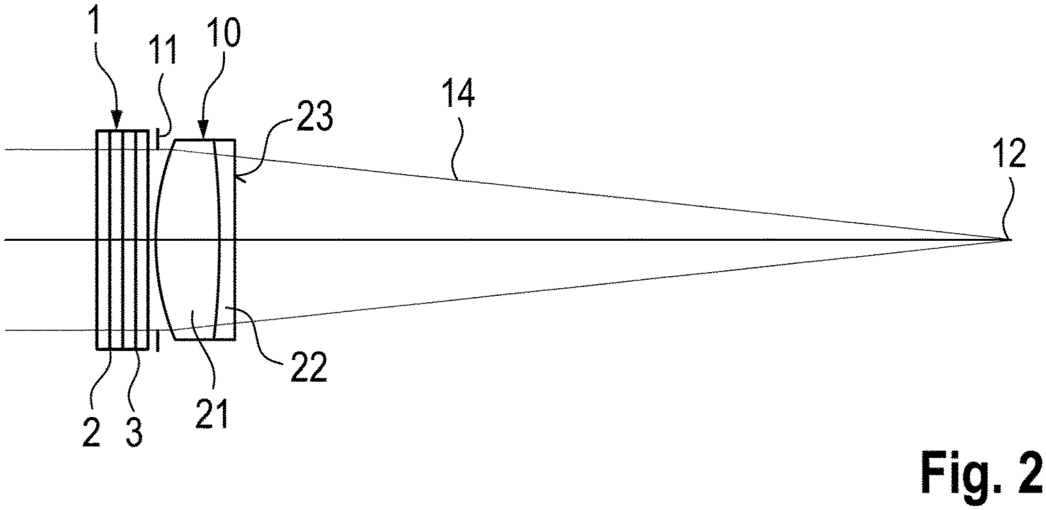
FIG. 2 schematically shows the beam path of an initial arrangement for developing an optical device according to certain embodiments of the invention.

FIG. 2 schematically shows the beam path of an initial arrangement for developing an optical device. In the example shown in FIG. 2, a wavefront manipulator 1, which is to say an achromatic zoom lens, is disposed upstream of a fixed focal length group or arrangement of optical elements 10, preferably in the form of a rotationally symmetric optical group, in order to enable a continuous adaptation of focusing on different object distances between $S_0$=−500 mm and $S_0$=−167 mm. The diameter of the aperture stop 11 is 14 mm.

The beam path is labeled by reference sign 14, and the focus is labeled by reference sign 12.

Three steps are carried out to illustrate the teaching according to certain embodiments of the invention using the example: First, a rotationally symmetric optical group which is designed for a fixed mean object distance of $S_0$=−250 mm and which is virtually aberration-free for this fixed object distance is specified. In this case, this is a similar initial arrangement as in DE 10 2014 118 383 A1 and DE 10 2011 055 777 B4, although the parameters thereof have been slightly modified.

In the second step, a non-achromatized zoom lens, as should be considered known according to the prior art, is initially added for the purpose of varying the system refractive power and hence providing an adaptation to the modified front focal distance. The result shows that an unavoidable longitudinal chromatic aberration occurs in the deflected positions of the manipulator.

Finally, the novel solution according to certain embodiments of the invention is specified; it allows the chromatic image errors to be avoided virtually in their entirety and over the entire distance range.

In the example, the optical unit imaging virtually aberration-free for a fixed mean object distance of $S_0$=−250 mm is provided by a rotationally symmetric hybrid optical unit. The latter consists of a converging lens 21 made of FK5 material by SCHOTT AG with an aspherical front side and, cemented therewith, a spherical diverging lens 22 made of SF1 material by SCHOTT AG. An asphere is understood as meaning a lens with a rotationally symmetric surface, the surface of which may have surface regions with differing radii of curvature. A DOE structure, which is to say a number of diffractive optical elements, has been provided on the back side 23 of the diverging lens 22. To take account of the glass paths of the subsequently required elements of the zoom lens, plane-parallel glass plates are provided from the same material types which is subsequently used to form the zoom lens.

Here, this part of the system serves to simulate a virtually ideally corrected fixed focal length optical unit which, in practical applications, may naturally also be formed by very differently constructed multi-lens objectives. In the example, the fixed focal length group is designed such that it images an object situated 250 mm in front of the vertex of the glass surface located furthest to the left (left glass plate or first optical component 2) onto an image plane at a distance of 50 mm from the last lens vertex located to the right. An objective for a surgical microscope is a suitable application for the example described here.

To illustrate the essential concept more clearly, the present example is restricted to idealized boundary conditions (only one field point) because otherwise the technical teaching to be demonstrated would unnecessarily be made more complex on account of the many image error compromises that have to be made. FIG. 2 shows this basic optical system, which occurs unchanged in the systems for step 2 and 3.

Figure 3:
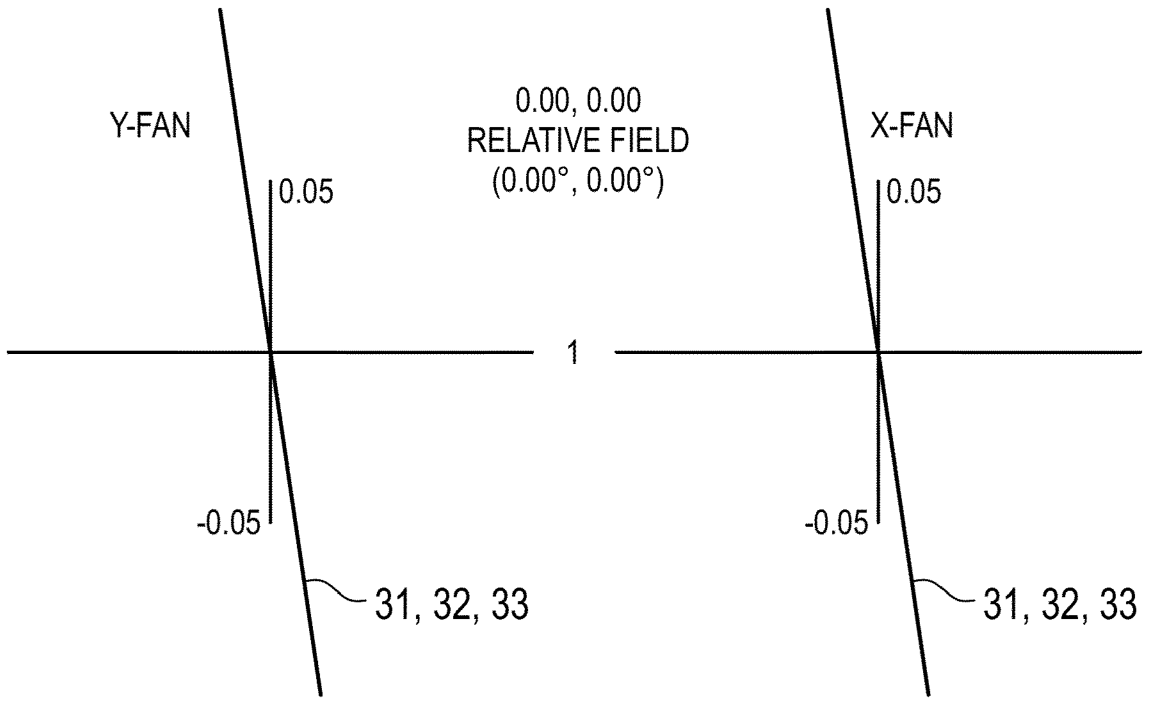
FIG. 3 shows the image error curves associated with an initial arrangement, for an object distance of −500 mm.
Figure 4:
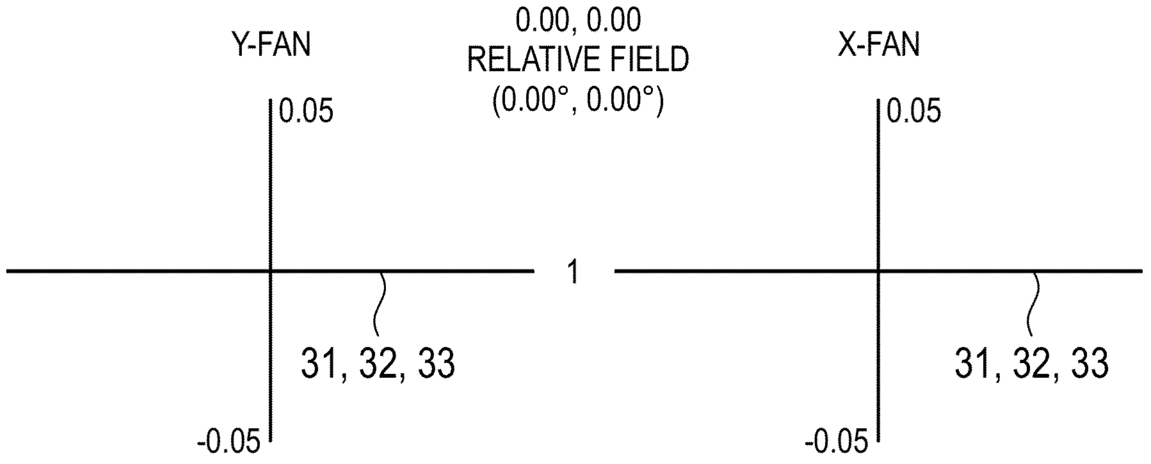
FIG. 4 shows the image error curves associated with the initial arrangement, for an object distance of −250 mm.
Figure 5:
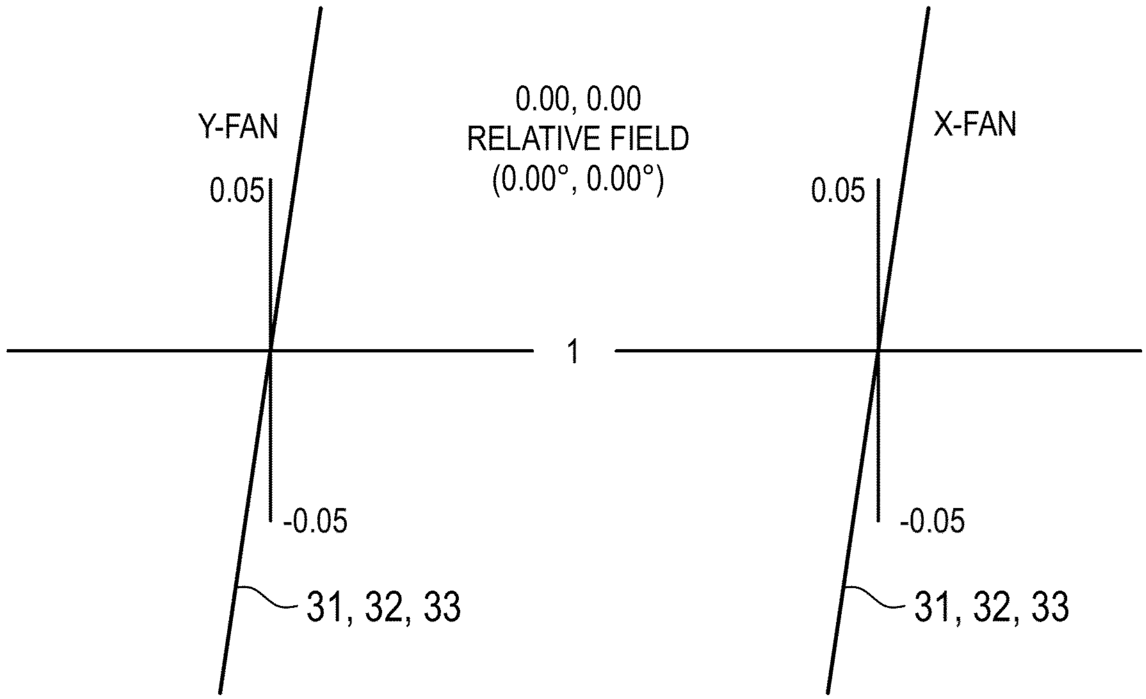
FIG. 5 shows the image error curves associated with the initial arrangement, for an object distance of −166.67 mm.

FIGS. 3 to 5 show the associated image error curves (transverse aberrations) for the three object distances of −500 mm (FIG. 3), −250 mm (FIG. 4), and −166.67 mm (FIG. 5). The vertical axis corresponds to the geometric-optical transverse aberrations in the receiver plane in millimeters and reaches +0.05 mm. The horizontal axis corresponds to the relative pupil coordinate, normalized to values from −1 to +1, of the intersection point of the rays with the plane of the aperture stop. The curves 31 relate to a wavelength of 656 nm, the curves 32 relate to a wavelength of 546 nm, and the curves 33 relate to a wavelength of 435 nm. It is quite evident that there is a practically residual error-free, diffraction-limited optical unit for the object distance of −250 mm (FIG. 4), for which the basic optical system 10 is designed, and that the expectable focal error occurs for the remaining object distances. In the drawings, the corresponding curves 31, 32, and 33 for the three wavelengths of 656 nm, 546 nm, and 435 nm, used by way of example, are superimposed on one another since the basic optical unit 10 with the DOE has a virtually perfect chromatic correction for the given object distance.

The basic structural data for the initial arrangement shown in FIG. 2 are specified in table 1 hereinafter. Faces 1 to 10 denote the individual surfaces of the lenses and the optical elements in FIG. 2 from left to right. Face 1 thus corresponds to the outer surface 7 of the first optical component 2 and face 10 corresponds to the back-side surface 23 of the spherical diverging lens 22.

TABLE 1

| Face | Vertex radius of the surface curvature | Distance to the next face (air gap or lens thickness) | Glass trade name, with manufacturer information |
|---|---|---|---|
| Object | Infinite | 250.000000 | |
| 1 | Infinite | 0.800000 | PLASF47_SCHOTT |
| 2 | Infinite | 0.800000 | P-CARBO (polycarbonate) |
| 3 | Infinite | 0.050000 | |
| 4 | Infinite | 0.800000 | P-CARBO (polycarbonate) |
| 5 | Infinite | 0.800000 | PLASF47_SCHOTT |
| 6 | Infinite | 0.500000 | |
| Stop | Infinite | 0.000000 | |
| 8 | 17.85460 | 4.000000 | FK5_SCHOTT |
| 9 | −76.59000 | 1.000000 | SF1_SCHOTT |
| 10 | 275.92000 | 50.000000 | |
| Image plane | Infinite | 0.00000 | |

Face 8 is an asphere with the coefficients A=−0.116309E-04, B=−0.246389E-07, C=−0.511441E-10 and D=0.194977E-12, in accordance with the formula already specified above:

$$z = \frac{(x^2+y^2)/R}{1+\sqrt{1-(1+k)\cdot\frac{(x^2+y^2)}{R^2}}} + A\cdot(x^2+y^2)^2 + B\cdot(x^2+y^2)^3 + C\cdot(x^2+y^2)^4 + D\cdot(x^2+y^2)^5$$

Face 10 comprises a diffractive optical element which is used in the +1st order of diffraction for a design wavelength of 546.00 nm. The diffractive optical element has a rotationally symmetrical polynomial grating with terms $C1^*r^2$ and $C2^*r^4$ and coefficients C1=−1.9089E-04 and C2=5.4604E-07. The grating is designed as an ideal blazed grating (100% of the light is diffracted into a specific order of diffraction for all wavelengths).

Figures 6, 7:
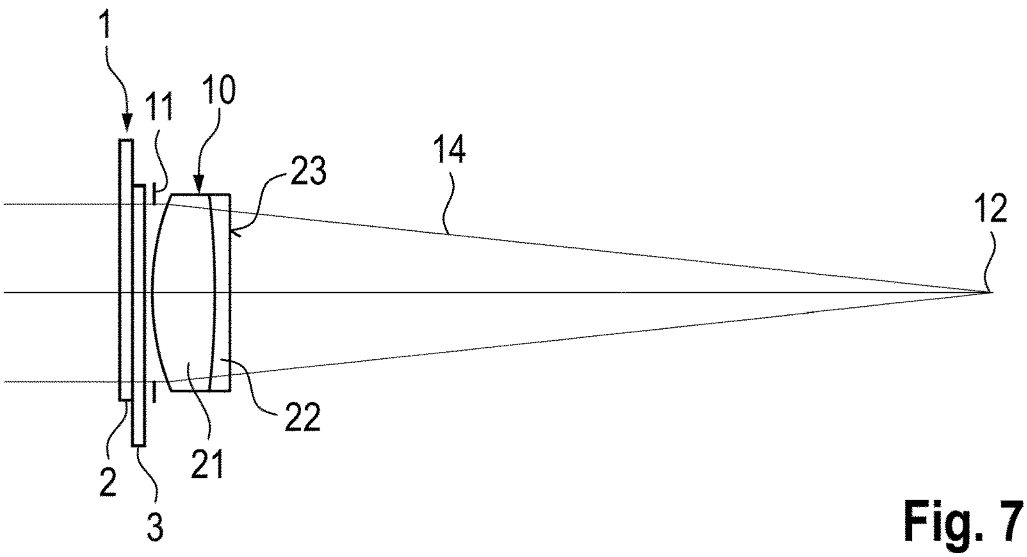
FIG. 6 shows the construction data associated with the initial arrangement shown schematically in FIG. 2.
FIGS. 7-9 schematically show the beam path of an initial arrangement for developing an optical device according to certain embodiments of the invention, with a non-achromatized Alvarez lens according to the prior art for focusing at different object distances.

FIG. 6 specifies the associated construction data of the exemplary embodiment using the nomenclature of the optics design program CodeV by Synopsys.

Figure 8:
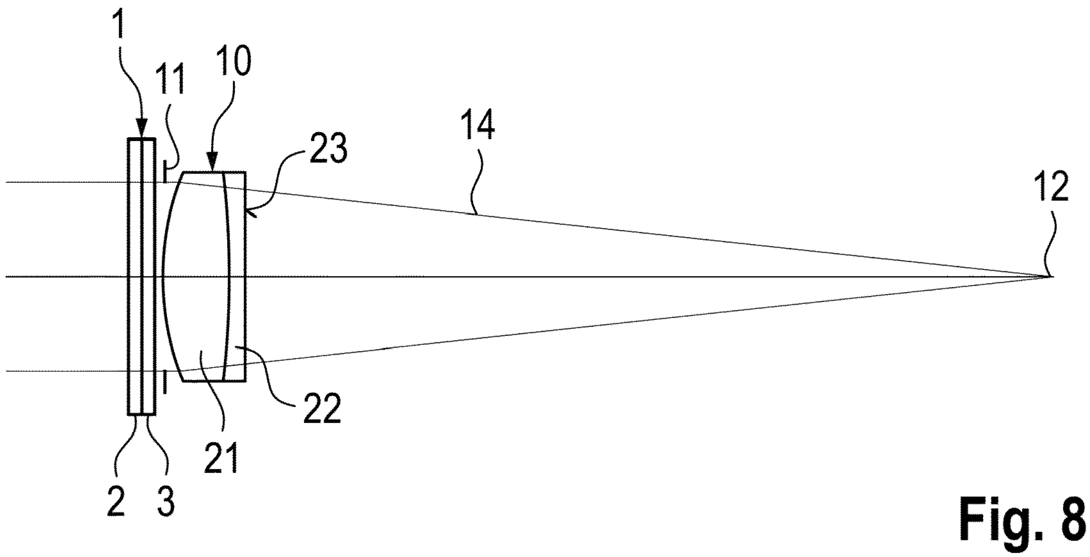
Figure 9:
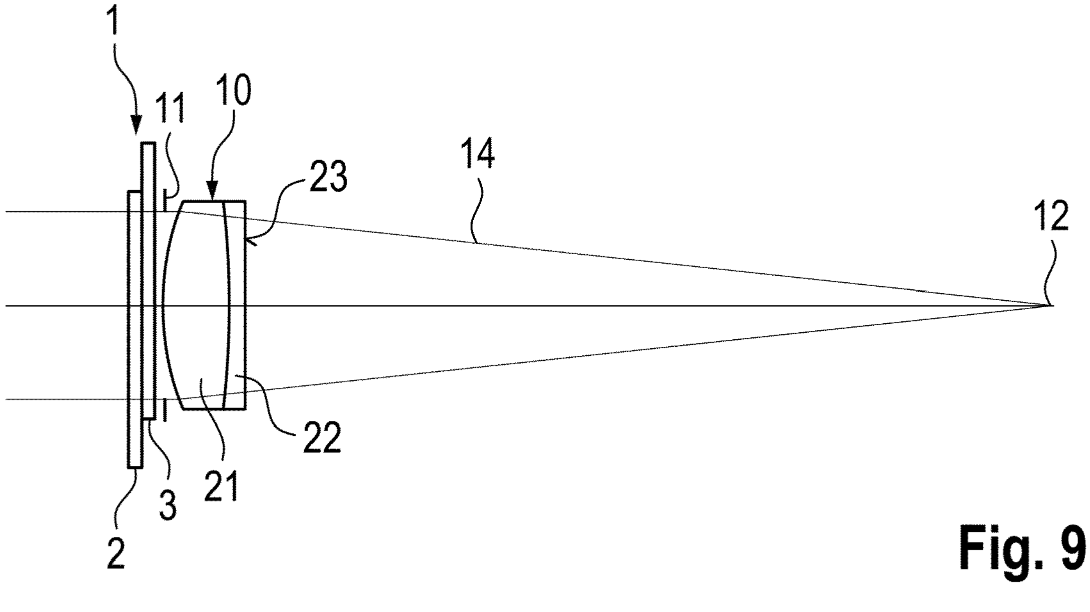

In step 2, FIGS. 7 to 9 show a non-achromatized Alvarez lens according to the prior art for focusing on different object distances, which are $S_0$=−500 mm (FIG. 7), $S_0$=−250 mm (FIG. 8), and $S_0$=−166.67 mm (FIG. 9) in the example, in place of the plane-parallel glass plates in front of the basic optical system 10. In FIGS. 7 to 9, the optical unit is shown in the 3 positions in a sectional view: The two elements 2 and 3, which each carry a free-form surface 26 on the inner side, are moved counter to one another laterally such that a variable air lens arises in the inner region (principle of the Alvarez zoom lens). In this case, the 3 positions correspond to the three stated object distances $S_0$. The position of the image plane relative to the fixed focal length group remains constant (50 mm clear back focal distance). The example also makes use of higher orders of the Alvarez free-form surface, in order to be able to also accordingly adapt the spherical aberration in the case of a modified front focal distance. The DOEs of the basic optical system are each operated in the +1st order of diffraction. The displacement paths of the first laterally moved free-form element are +2.0 mm (FIG. 7), 0.0 mm (FIG. 8), −2.0 mm (FIG. 9) in the 3 positions. In this case, the second element is displaced in each case by the same absolute values, but in the opposite direction.

Figure 10:
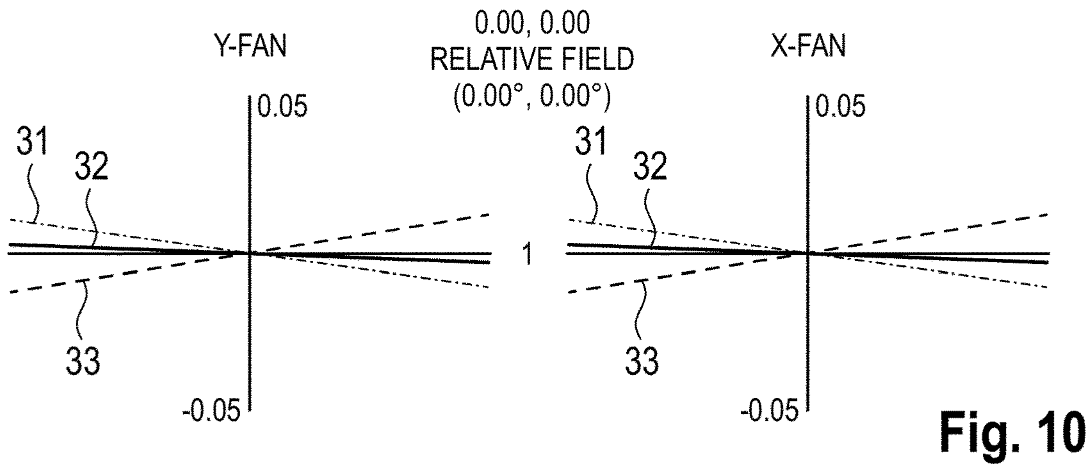
FIG. 10 shows the image error curves associated with FIG. 7, for an object distance of −500 mm.
Figure 11:
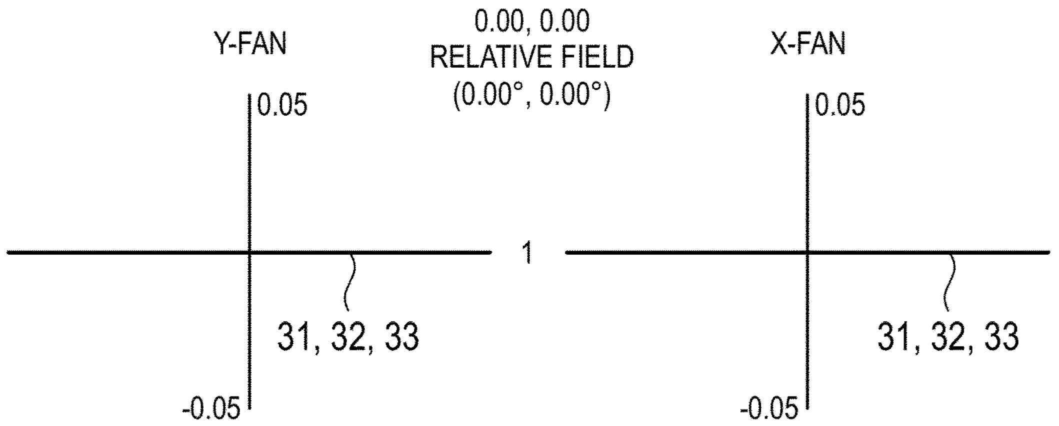
FIG. 11 shows the image error curves associated with FIG. 8, for an object distance of −250 mm.
Figure 12:
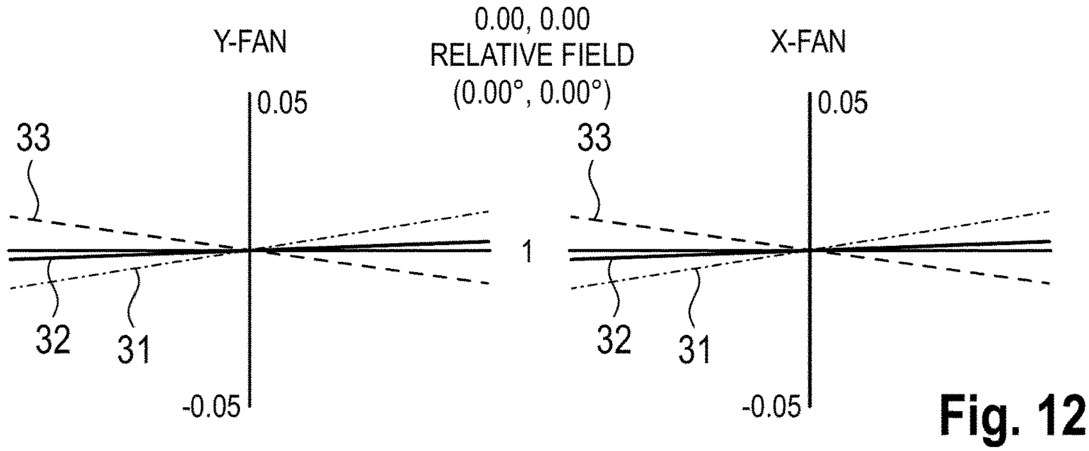
FIG. 12 shows the image error curves associated with FIG. 9, for an object distance of −166.67 mm.

FIGS. 10 to 12 show the associated image error curves for the three object distances of −500 mm (FIG. 7), −250 mm (FIG. 8), and −166.67 mm (FIG. 9).

Table 2 below specifies the basic structural data of the arrangement developed according to step 2 and shown schematically in FIGS. 7 to 9. Faces 1 to 14 denote the individual surfaces of the lenses and the optical elements in FIGS. 7 to 9 from left to right. In this case, faces 12 to 14 correspond to faces 8 to 10 of FIG. 2 and table 1.

TABLE 2

| Face | Vertex radius of the surface curvature | Distance to the next face (air gap or lens thickness) | Glass trade name, with manufacturer information |
|---|---|---|---|
| Object | Infinite | 500.000000 | |
| 1 | Infinite | 0.000000 | |
| 2 | Infinite | 1.000000 | PLASF47_SCHOTT |
| 3 | Infinite | 0.000000 | |
| 4 | Infinite | 0.000000 | |
| 5 | Infinite | 0.100000 | |
| 6 | Infinite | 0.000000 | |
| 7 | Infinite | 1.000000 | PLASF47_SCHOTT |
| 8 | Infinite | 0.000000 | |
| 9 | Infinite | 0.000000 | |
| 10 | Infinite | 0.500000 | |
| Stop | Infinite | 0.000000 | |
| 12 | 17.85460 | 4.000000 | FK5_SCHOTT |
| 13 | −76.59000 | 1.000000 | SF1_SCHOTT |
| 14 | 275.92000 | 50.000000 | |
| Image plane | Infinite | 0.00000 | |

Faces 1 and 9 have a decentration of 1.966888 in the y-direction. Faces 4 and 6 have a decentration of −1.966888 in the y-direction. Faces 3 and 7 are free-form surfaces with the coefficients $C_{0.1}$=1.1469E-02, $C_{2.1}$=−3.0928E-04, $C_{0.3}$=−1.0310E-04, $C_{4.1}$=4.6548E-09, $C_{2.3}$=3.0196E-09, $C_{0.5}$=9.2867E-10, of the Taylor polynomial expansion:

$$z(x, y) = \sum_{m,n=1}^{\infty} C_{m,n} x^m y^n$$

Face 12 is an asphere with the coefficients A=−0.116309E-04, B=−0.246389E-07, C=−0.511441E-10 and D=0.194977E-12, in accordance with the formula already specified above:

$$z = \frac{(x^2+y^2)/R}{1+\sqrt{1-(1+k)\cdot\frac{(x^2+y^2)}{R^2}}} + A\cdot(x^2+y^2)^2 + B\cdot(x^2+y^2)^3 + C\cdot(x^2+y^2)^4 + D\cdot(x^2+y^2)^5$$

Face 14 comprises a diffractive optical element which is used in the +1st order of diffraction for a design wavelength of 546.00 nm. The diffractive optical element has a rotationally symmetrical polynomial grating with terms $C1^*r^2$ and $C2^*r^4$ and coefficients C1=−1.9089E-04 and C2=5.4604E-07. The grating is designed as an ideal blazed grating (100% of the light is diffracted into a specific order of diffraction for all wavelengths).

FIG. 13 specifies the associated construction data of the exemplary embodiment using the nomenclature of the optics design program CodeV by Synopsys.

Figure 14:
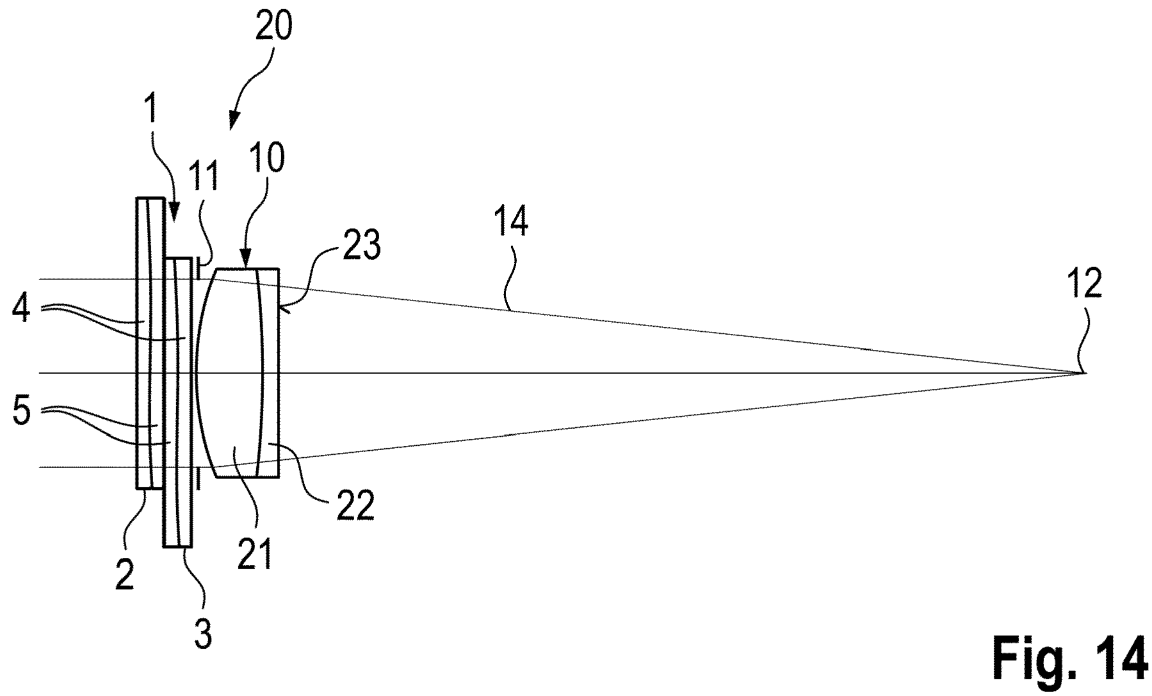
FIGS. 14-16 schematically show the beam path of an optical device according to certain embodiments of the invention, with a wavefront manipulator according to certain embodiments of the invention for focusing at different object distances.
Figure 15:
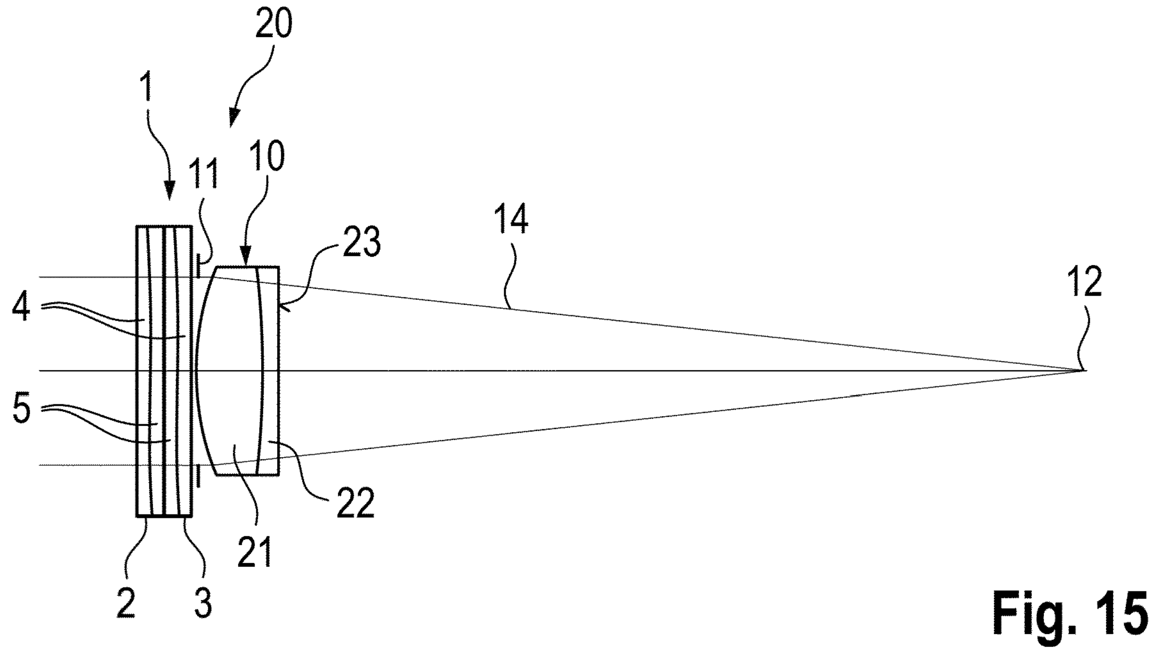
Figure 16:
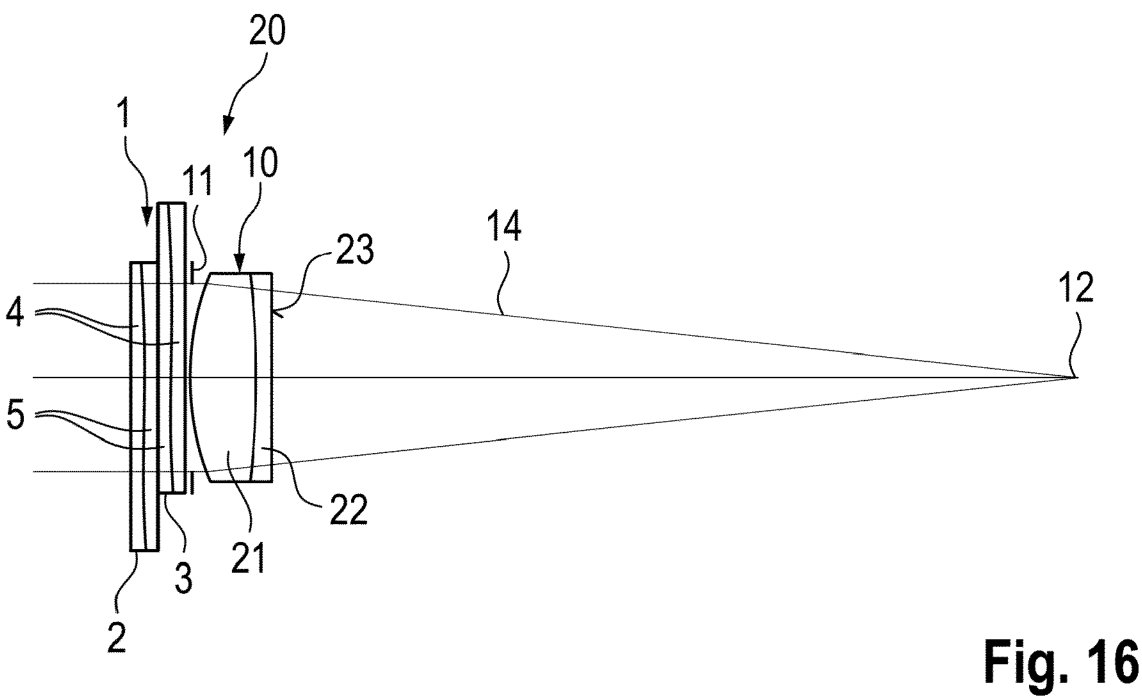

Now, an embodiment of the achromatic zoom lens with two optical components 2 and 3 moved laterally to one another is shown in step 3. FIGS. 14, 15, and 16 schematically show the beam path of an optical device 20, with a wavefront manipulator 1 for focusing at different object distances. Once again, the position of the image plane is constant here and unmodified vis-à-vis the example in the preceding step.

Table 3 below specifies the basic structural data of the arrangement developed according to step 3 and shown schematically in FIGS. 14 to 16. Faces 1 to 16 denote the individual surfaces of the lenses and the optical elements in FIGS. 14 to 16 from left to right. In this case, faces 14 to 16 correspond to faces 8 to 10 of FIG. 2 and table 1.

TABLE 3

| Face | Vertex radius of the surface curvature | Distance to the next face (air gap or lens thickness) | Glass trade name, with manufacturer information |
|---|---|---|---|
| Object | Infinite | 500.000000 | |
| 1 | Infinite | 0.000000 | |
| 2 | Infinite | 0.800000 | PLASF47_SCHOTT |
| 3 | Infinite | 0.800000 | P-CARBO (polycarbonate) |
| 4 | Infinite | 0.000000 | |
| 5 | Infinite | 0.000000 | |
| 6 | Infinite | 0.050000 | |
| 7 | Infinite | 0.000000 | |
| 8 | Infinite | 0.800000 | P-CARBO (polycarbonate) |
| 9 | Infinite | 0.800000 | PLASF47_SCHOTT |
| 10 | Infinite | 0.000000 | |
| 11 | Infinite | 0.000000 | |
| 12 | Infinite | 0.500000 | |
| Stop | Infinite | 0.000000 | |
| 14 | 17.85460 | 4.000000 | FK5_SCHOTT |
| 15 | −76.59000 | 1.000000 | SF1_SCHOTT |
| 16 | 275.92000 | 50.000000 | |
| Image plane | Infinite | 0.00000 | |

Faces 1 and 11 have a decentration of 2.000000 in the y-direction. Faces 5 and 7 have a decentration of −2.000000 in the y-direction. Faces 3 and 9 are free-form surfaces with the coefficients $C_{0,1}$=2.0348E-02, $C_{1,0}$=−1.6460E-02, $C_{0,2}$=−1.4682E-03, $C_{2,1}$=−1.1335E-03, $C_{0,3}$=−3.7517E-04, $C_{4,0}$=4.2694E-06, $C_{2,2}$=−1.2405E-06, $C_{0,4}$=−4.27508E-07, $C_{4,1}$=−6.6939E-08, $C_{2,3}$=−2.3783E-08 and $C_{0,5}$=−1.4727E-09 of the Taylor polynomial expansion:

$$z(x, y) = \sum_{m,n=1}^{\infty} C_{m,n} x^m y^n$$

FIG. 20 specifies the associated construction data of the exemplary embodiment using the nomenclature of the optics design program CodeV by Synopsys.

Figure 17:
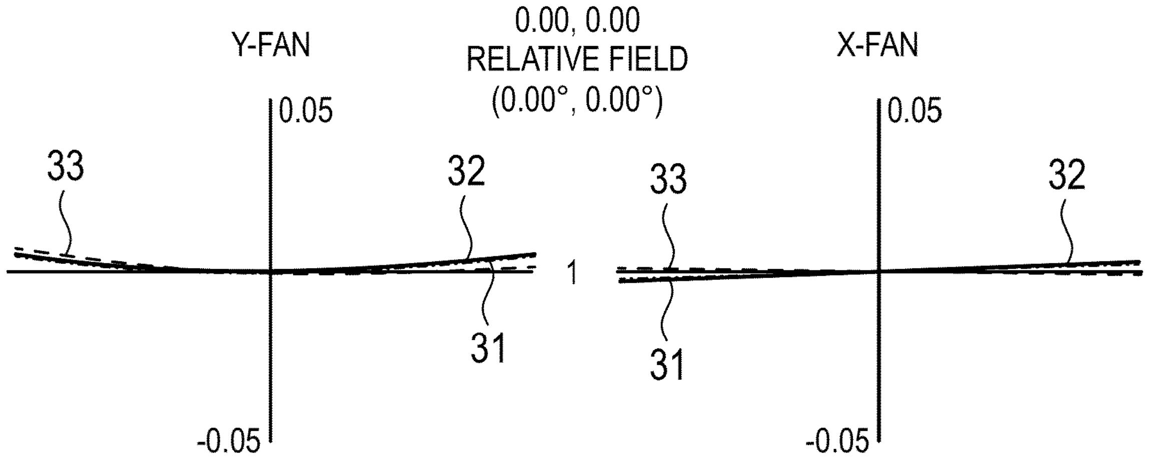
FIG. 17 shows the image error curves associated with FIG. 14, for an object distance of −500 mm.
Figure 18:
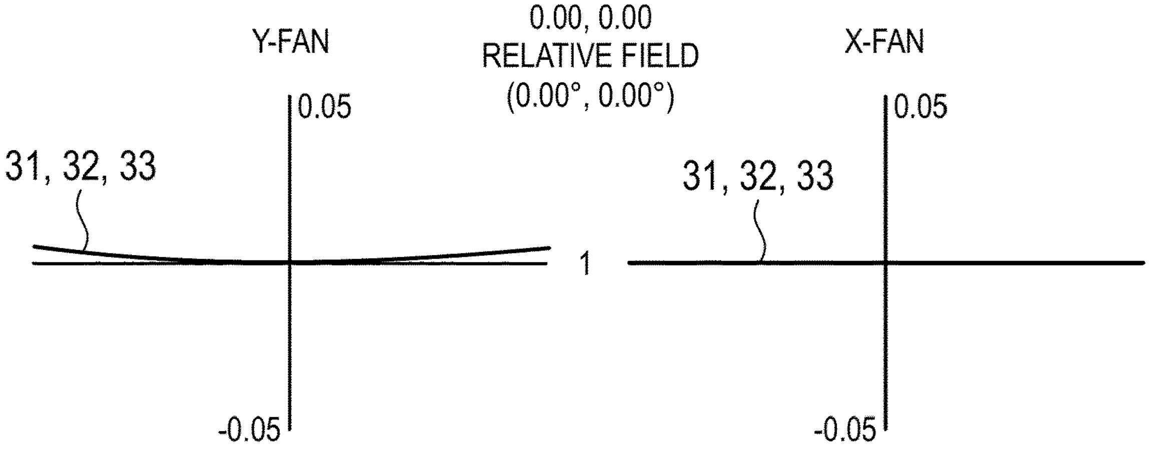
FIG. 18 shows the image error curves associated with FIG. 15, for an object distance of −250 mm.
Figure 19:
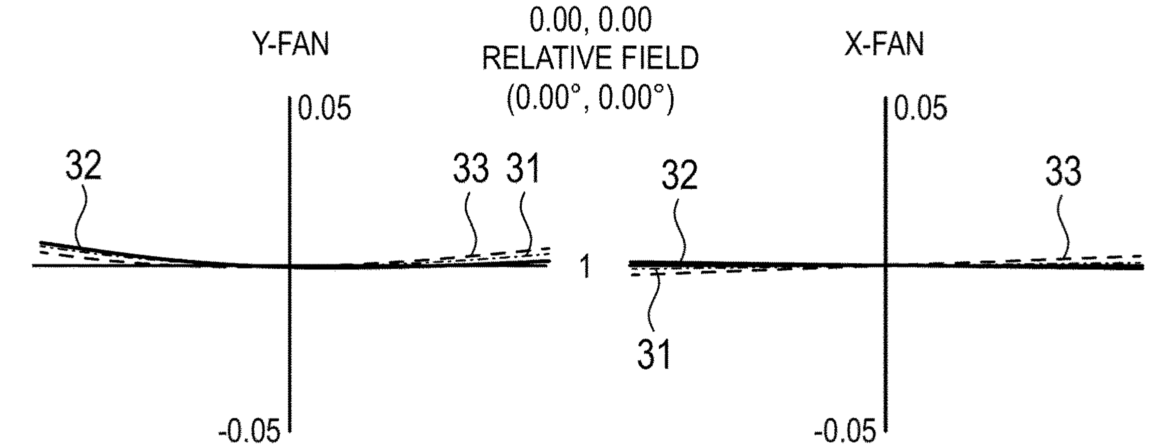
FIG. 19 shows the image error curves associated with FIG. 16, for an object distance of −166.67 mm.

FIGS. 17 to 19 show the associated image error curves for the three object distances of −500 mm (FIG. 14), −250 mm (FIG. 15), and −166.67 mm (FIG. 16). From the profile of the transverse aberration curves shown for the various wavelengths in FIGS. 17 to 19, it is evident that the longitudinal chromatic aberration CHL has now been corrected, this precisely being the object of the wavefront manipulator used in this exemplary embodiment.

The optical media of the first optical elements 4 and the second optical elements 5 (free-form partial elements) in this case satisfy, to a very good approximation, the equation of condition $$\frac{n_1 - 1}{v_1} - \frac{n_2 - 1}{v_2} = 0$$

or the inequality $$\left|\frac{n_1 - 1}{v_1} - \frac{n_2 - 1}{v_2}\right| \leq 0.001.$$

The glass type PLASF47 from Schott AG is used as the material of the first optical element 4. Its refractive index at a wavelength of 546 nm is $n_1$=1.81078 and the Abbe number is $v_1$=40.7. Polycarbonate is used as the material of the second optical element 5; it is a exceptionally transparent and, for the production of optical components by injection molding, widely used optical polymer. Its refractive index at a wavelength of 546 nm is $n_2$=1.59; the Abbe number is $v_2$=29.9.

The condition for the material selection, to be observed according to certain embodiments of the invention, thus is very well satisfied $$\frac{n_1 - 1}{v_1} - \frac{n_2 - 1}{v_2} = 0.00018844$$

by the specifications given above. The displacement paths of the first laterally moved optical component 2 again are +2.0 mm (FIG. 14), 0.0 mm (FIG. 15), −2.0 mm (FIG. 16) in the three positions. In this case, the second optical component 3 is displaced in each case by the same absolute values in the opposite direction.

In the example, higher orders of the Alvarez free-form surface 6, 26 are also used once again. On the one hand, this is implemented to be able to correct the spherical aberration accordingly in the case of a modified front focal length and, on the other hand, other coefficients of the free-form profile are exploited to minimize the maximum profile depth. This results in flatter partial elements and the optically effective free-form boundary surfaces 26 can be at a shorter distance from one another without colliding during the deflection. A shorter distance between the free-form boundary surfaces 26 helps to keep small the image errors resulting from the beam offset that does not match the paraxial consideration of the TEA.

LIST OF REFERENCE SIGNS

1 Wavefront manipulator
2 First optical component
3 Second optical component
4 First optical element
5 Second optical element
6 Contact face
7 Plane outer surface
8 Center axis
9 Optical axis
10 Arrangement of optical elements, for example rotationally symmetric objective
11 Stop
12 Focus
13 Outer surface
14 Beam path
20 Optical device
21 Aspherical converging lens
22 Spherical diverging lens
23 Back side
26 Free-form surface
32 Transverse aberration for a wavelength of 546 nm
31 Transverse aberration for a wavelength of 656 nm
33 Transverse aberration for a wavelength of 435 nm

The invention claimed is:

1. A wavefront manipulator, comprising:

a first optical component; and a second optical component arranged in succession along a reference axis, wherein the first optical component and the second optical component are arranged so as to be movable relative to one another in a plane perpendicular to the reference axis, wherein the first optical component and the second optical component each comprise:

a first optical element having at least one free-form surface, a refractive index $n_1$, and an Abbe number $v_1$, and a second optical element having at least one free-form surface, a refractive index $n_2$, and an Abbe number $v_2$, wherein the first and second optical elements are arranged in succession along the reference axis, wherein the first and second optical elements are directly connected to one another without any interspace therebetween, wherein the first optical element and the second optical element have a common contact face that is a free-form surface, and wherein the Abbe numbers $v_1$ and $v_2$ differing from one another.

2. The wavefront manipulator of claim 1, wherein the absolute value of the difference between the quotient of the refractive index $n_1$ reduced by 1 and the Abbe number $v_1$ of the first optical element and the quotient of the refractive index $n_2$ reduced by 1 and the Abbe number $v_2$ of the second optical element is less than a specified limit value $$\left|\frac{n_1-1}{v_1}-\frac{n_2-1}{v_2}\right|\leq G.$$

3. The wavefront manipulator of claim 2, wherein the limit value G is not more than 0.01.

4. The wavefront manipulator of claim 3, wherein the limit value G is not more than 0.005.

5. The wavefront manipulator of claim 1, wherein the absolute value of the difference between the Abbe number of the first optical element $v_1$ and the Abbe number of the second optical element $v_2$ does not drop below a specified limit value V, $|v_1-v_2|\geq V$.

6. The wavefront manipulator of claim 5, wherein the limit value of the absolute value of the difference of the Abbe numbers V is at least 5.

7. The wavefront manipulator of claim 1, wherein the absolute value of the difference between the refractive indices of the first optical element $n_1$ and the second optical element $n_2$ does not exceed a specified limit value N, $|n_1-n_2|\leq N$.

8. The wavefront manipulator of claim 7, wherein the limit value of the absolute value of the difference of the refractive indices N is not more than 0.05.

9. The wavefront manipulator of claim 1, wherein the free-form surface is configured to create a wavefront change $\Delta W(x,y)$ at a fundamental wavelength by virtue of the free-form profile function $z(x,y)$ being proportional to the anti-derivative of $\Delta W(x,y)$ in the direction of the movement of the elements with respect to one another, and configured to be proportional to the function $\Delta W(x,y)$ itself perpendicular to the movement direction, where x, y, and z are coordinates of a Cartesian coordinate system and a z-axis thereof runs parallel to the reference axis.

10. The wavefront manipulator of claim 1, wherein the first and second optical components have the same structural design in relation to their optical features.

11. The wavefront manipulator of claim 1, wherein at least one of the first and second optical components has at least one flat outer surface which extends perpendicular to the reference axis.

12. The wavefront manipulator of claim 1, wherein the first and second optical components are arranged so as to be movable relative to one another by translation in at least one direction perpendicular to the optical axis and/or by rotation about an axis running parallel to the reference axis.

13. The wavefront manipulator of claim 1, further comprising at least one sensor for detecting a position and/or a movement of the first and second optical components relative to one another.

14. The wavefront manipulator of claim 1, wherein the first optical element and the second optical element comprise a solid, optically transparent material.

15. The wavefront manipulator of claim 1, wherein at least one of the first and second optical components comprises at least two optical elements which have a relative partial dispersion that differ by less than a specified limit value T.

16. The wavefront manipulator of claim 1, wherein at least one of the first and second optical components comprises at least one optical element which has an anomalous relative partial dispersion.

17. The wavefront manipulator of claim 1, wherein at least one optical element of at least one of the first and second optical components comprises glass or an optical polymer or plastic or a monomer or a curing material.

18. An optical device, comprising the wavefront manipulator of claim 1.

19. A method of using at least one wavefront manipulator, comprising:

bringing about an adjustable change of a wavefront and/or causing at least one from the group of the following corrections or reductions: coma, astigmatism, dichromatic correction, trichromatic correction, reduction of the secondary spectrum, reduction of the tertiary spectrum and/or causing focusing and/or a position-dependent correction of at least one wavefront error in a zoom objective or a microscope, for an arrangement for a fast Z-scan or for a three-dimensional image stabilization via at least one wavefront manipulator according to claim 1.

* * * * *